Nov. 9, 1937.                H. S. WILLIAMS                2,098,410
                       MECHANICAL GAME APPARATUS
                         Filed May 25, 1934          12 Sheets-Sheet 2

INVENTOR
Homer S. Williams
BY W. S. McDowell ATTYS

Nov. 9, 1937.  H. S. WILLIAMS  2,098,410
MECHANICAL GAME APPARATUS
Filed May 25, 1934　　12 Sheets-Sheet 3

INVENTOR
Homer S. Williams
BY W. J. McHowell ATTYS

Nov. 9, 1937.   H. S. WILLIAMS   2,098,410
MECHANICAL GAME APPARATUS
Filed May 25, 1934   12 Sheets—Sheet 4

INVENTOR
Homer S. Williams
BY W S McDowell ATTYS

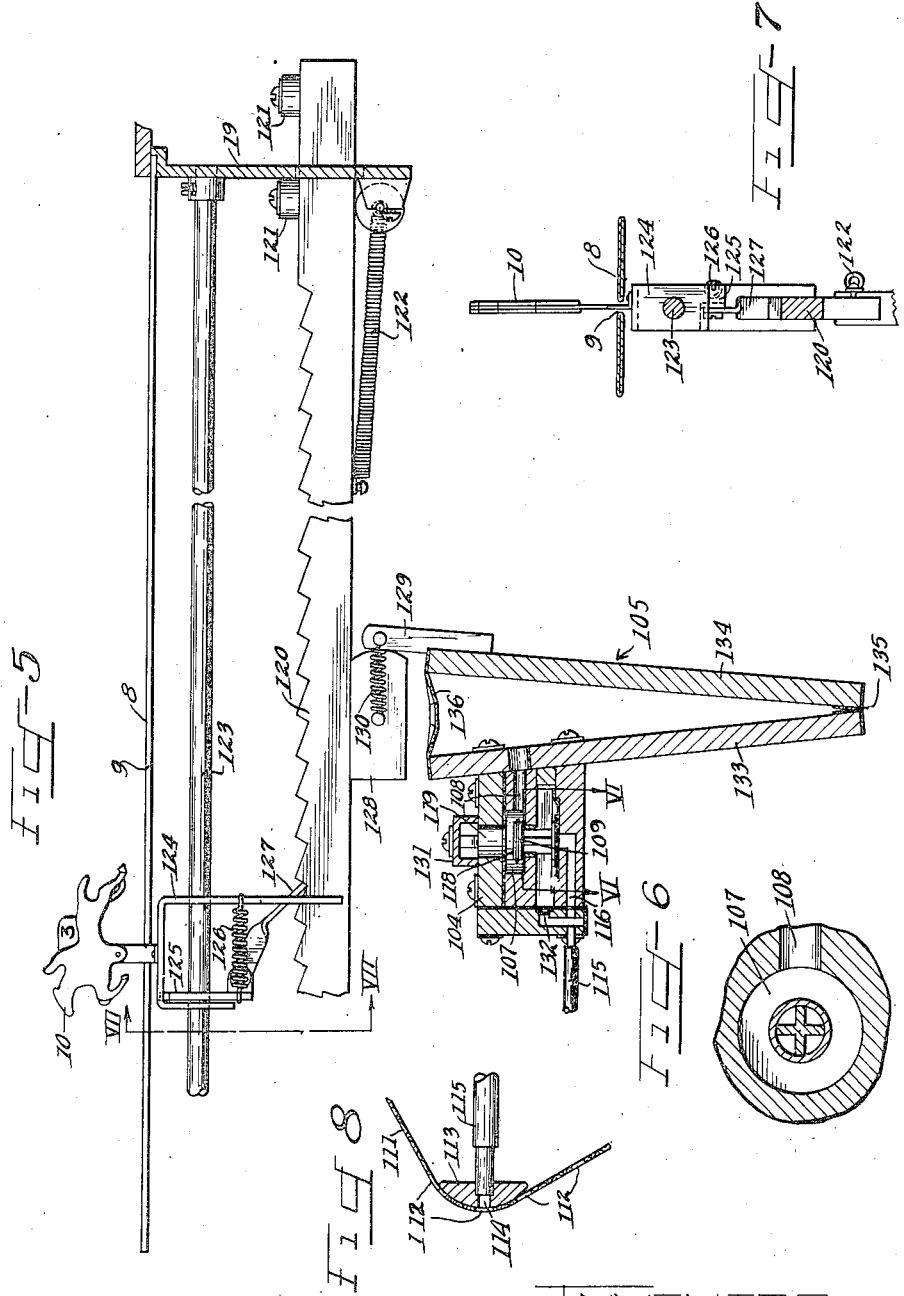

Nov. 9, 1937.   H. S. WILLIAMS   2,098,410
MECHANICAL GAME APPARATUS
Filed May 25, 1934    12 Sheets-Sheet 6
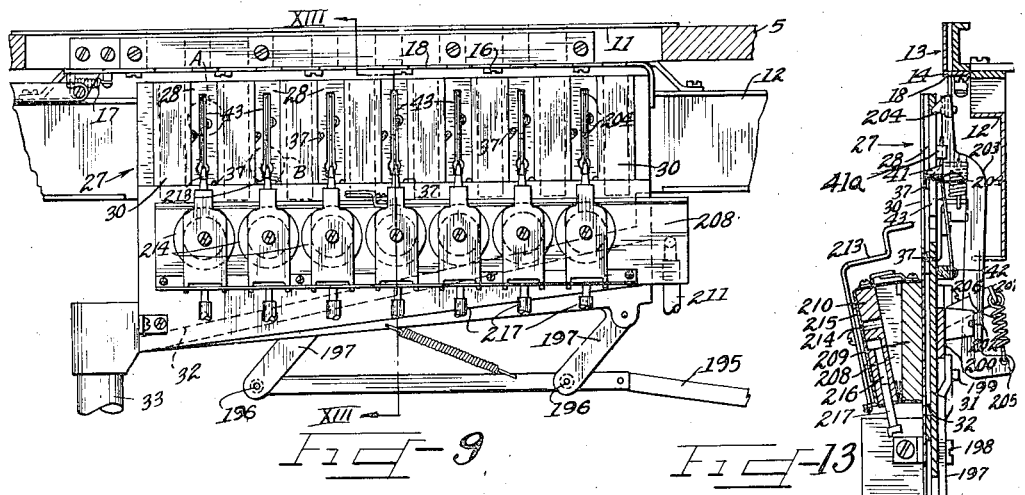
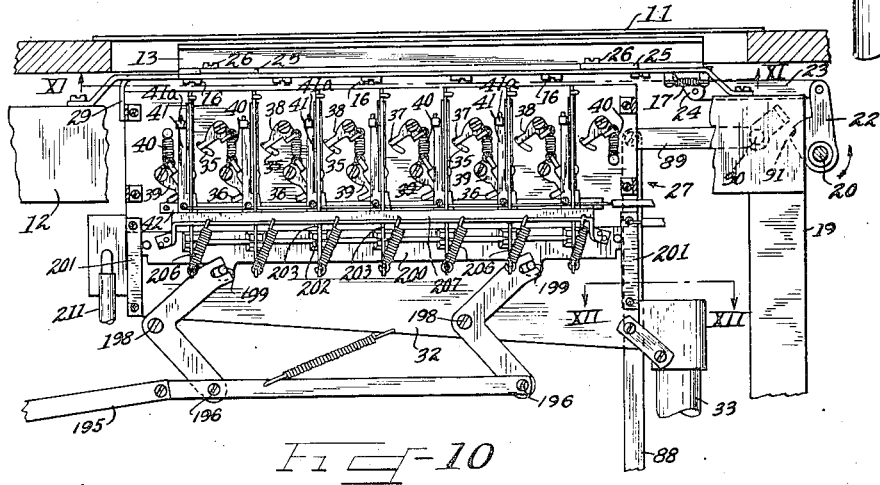
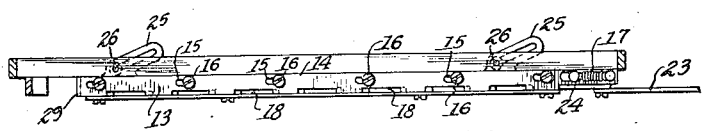
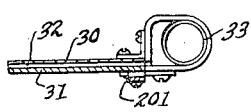
INVENTOR
Homer S. Williams
By W. S. McDowell ATTYS Nov. 9, 1937.　　　H. S. WILLIAMS　　　2,098,410
MECHANICAL GAME APPARATUS
Filed May 25, 1934　　12 Sheets-Sheet 7
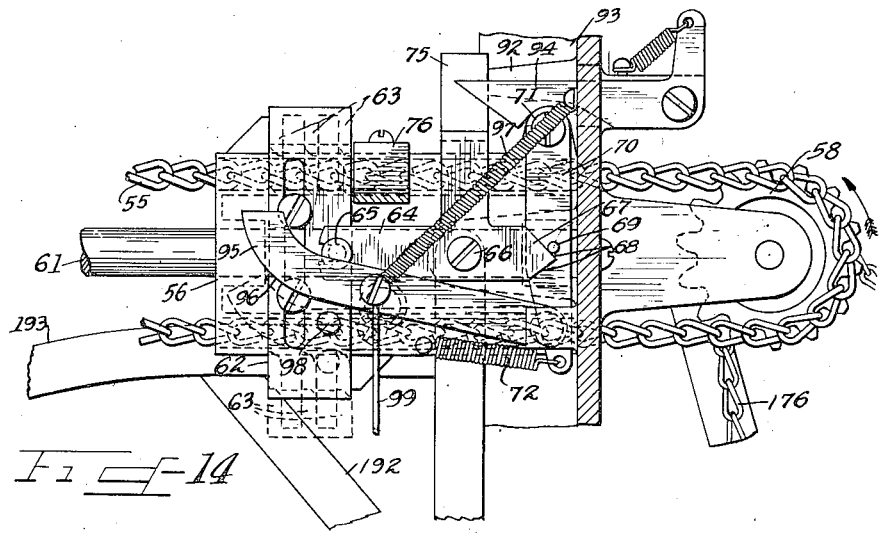
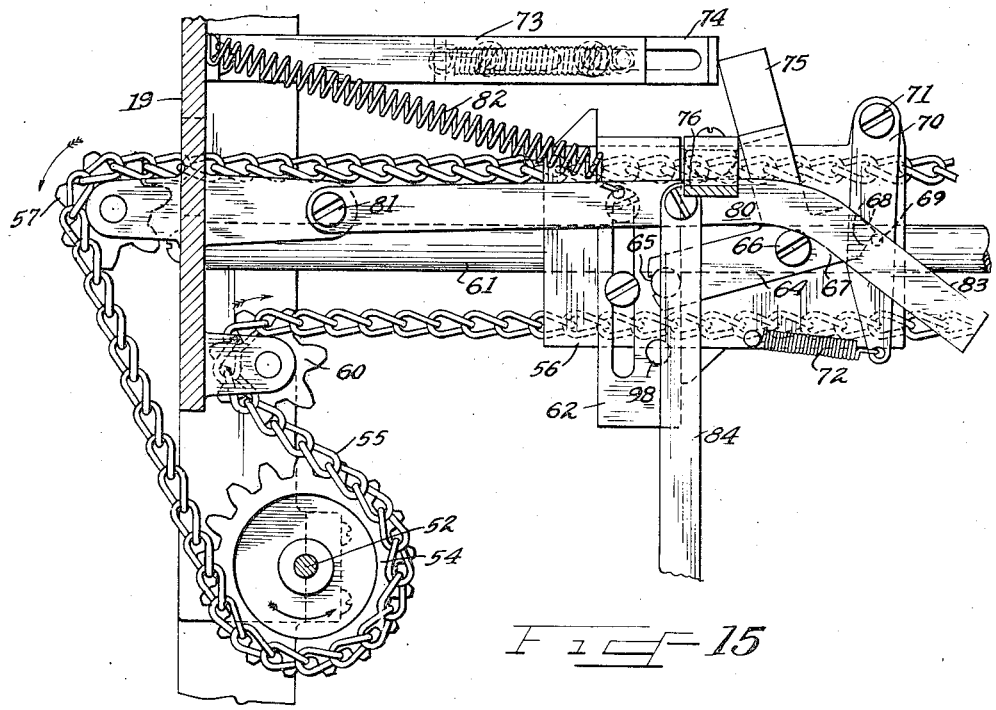
INVENTOR
*Homer S. Williams*
BY *W. S. McDowell* ATTYS

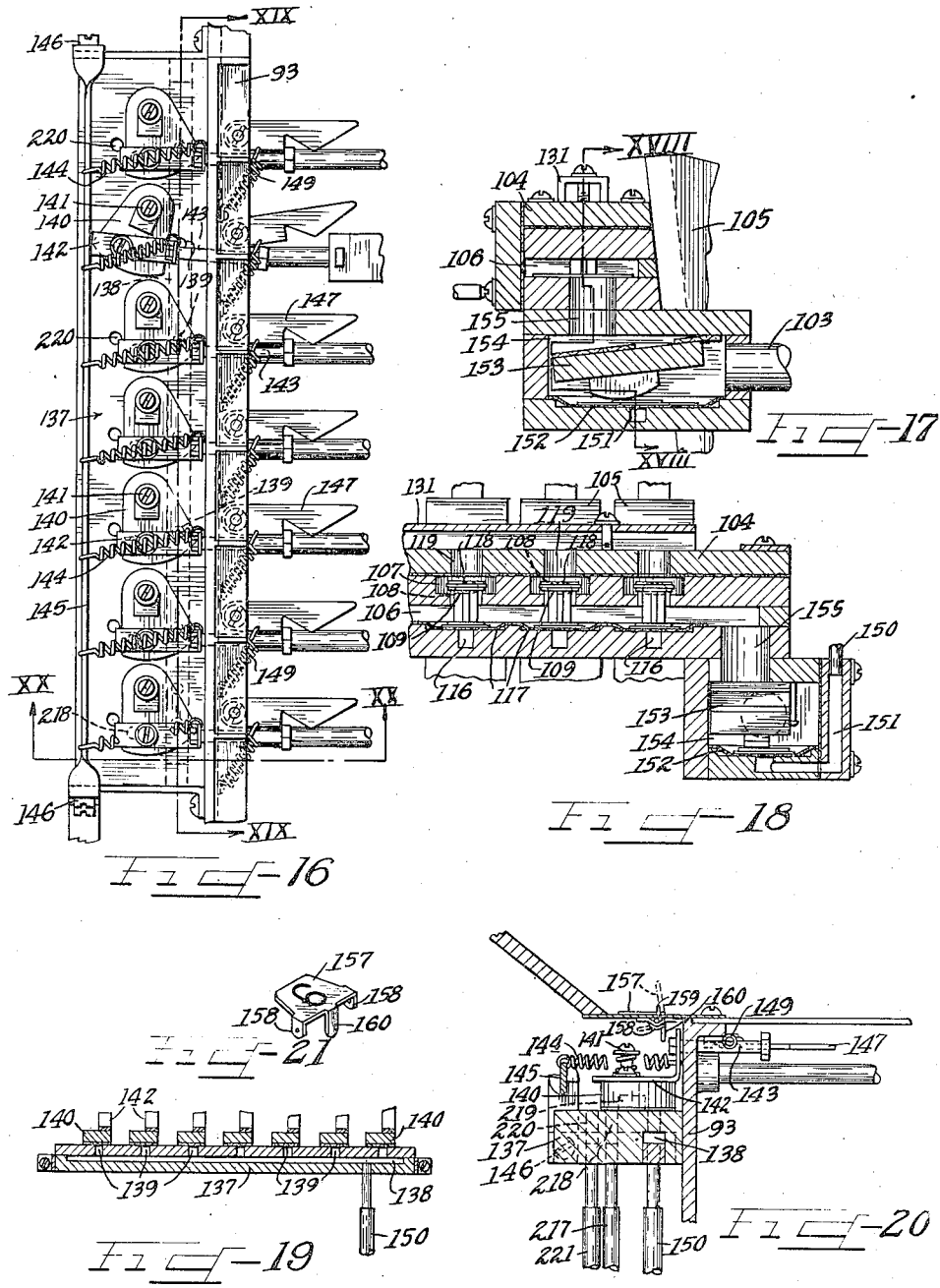

Nov. 9, 1937.                H. S. WILLIAMS                2,098,410
                        MECHANICAL GAME APPARATUS
                Filed May 25, 1934            12 Sheets-Sheet 9
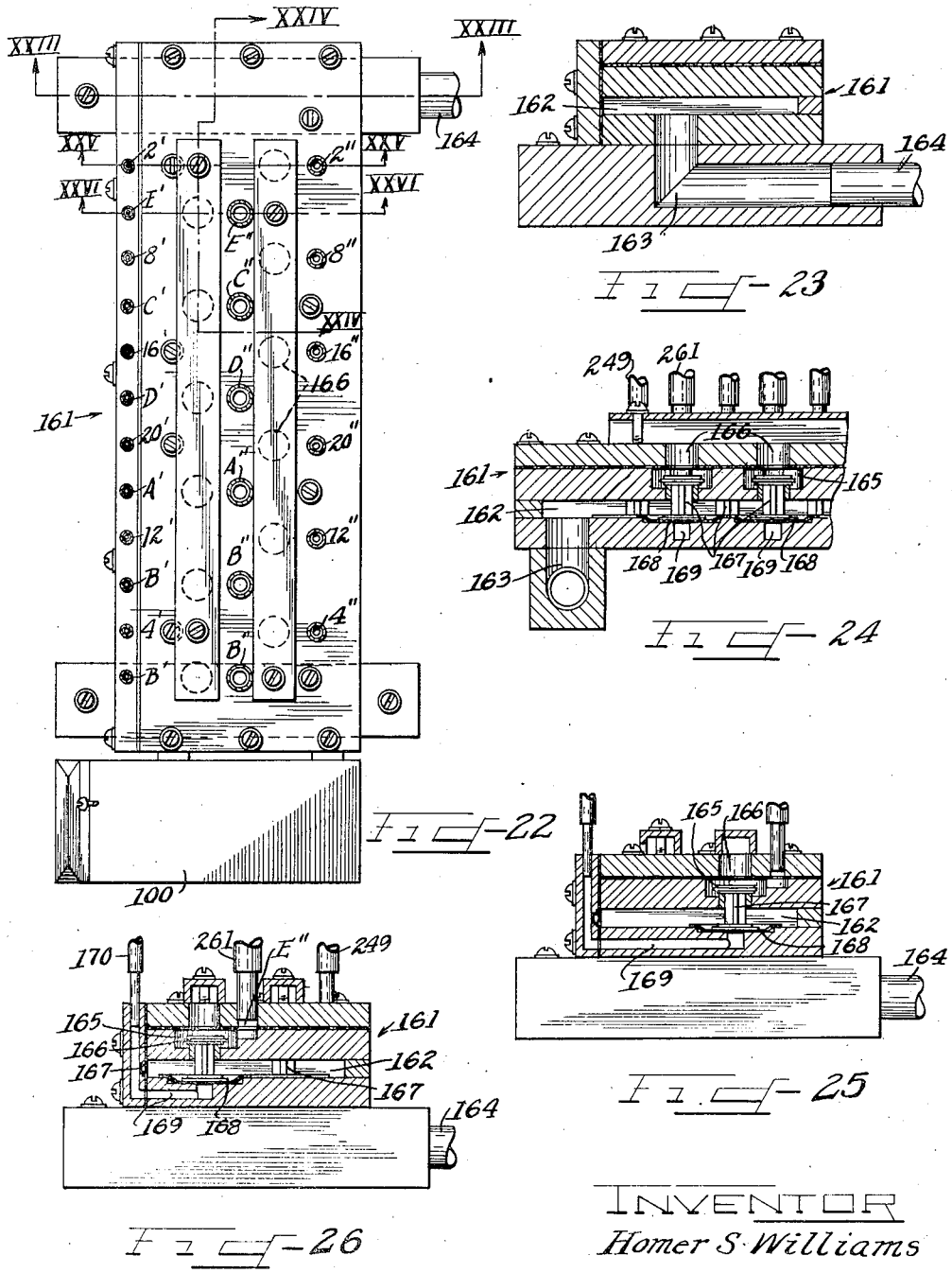
INVENTOR
Homer S. Williams
By H. S. McHowell ATTYS

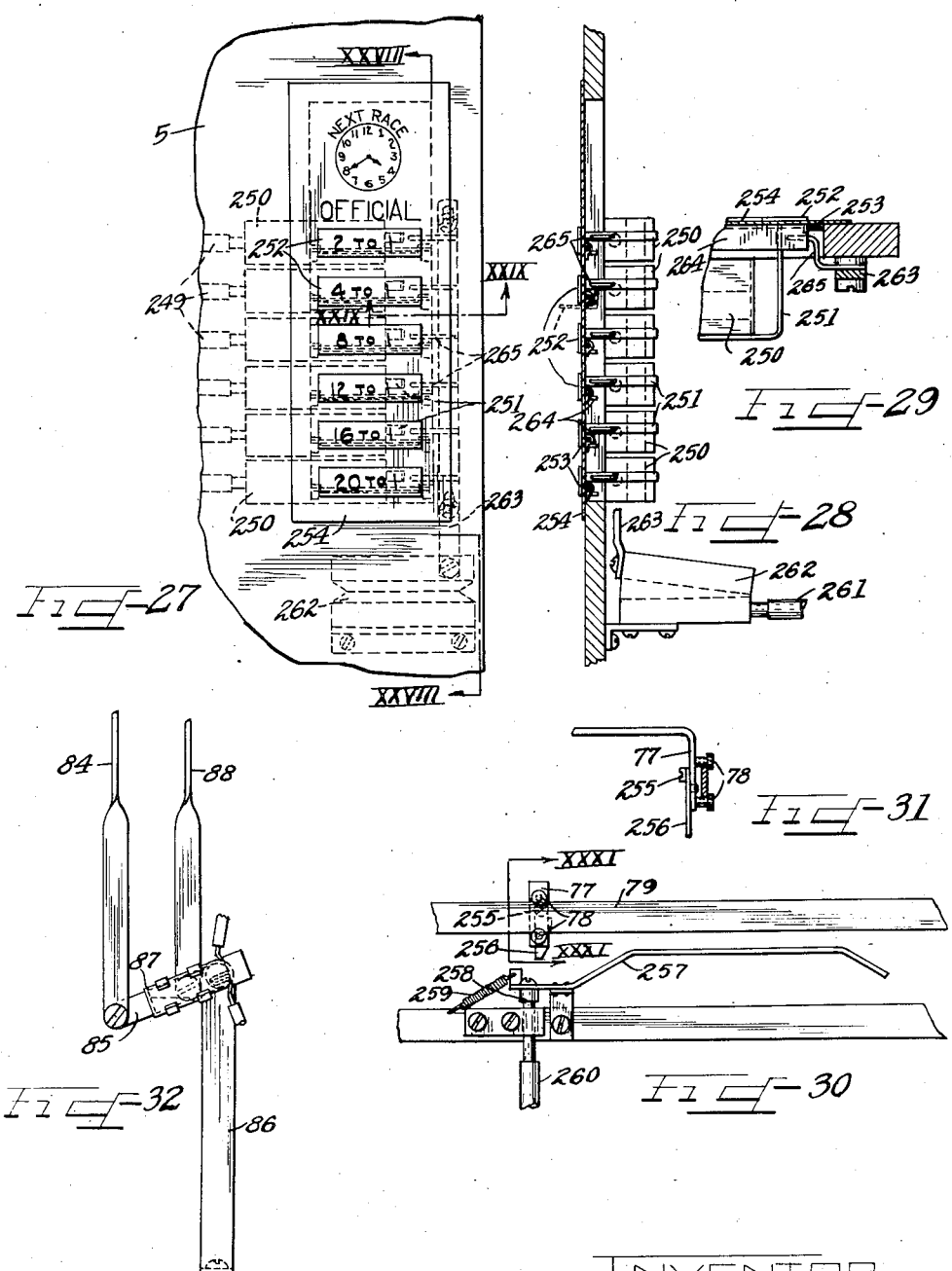

Nov. 9, 1937.   H. S. WILLIAMS   2,098,410
MECHANICAL GAME APPARATUS
Filed May 25, 1934   12 Sheets-Sheet 11

INVENTOR
Homer S. Williams

BY W. S. M. Powell ATTYS

Nov. 9, 1937.   H. S. WILLIAMS   2,098,410
MECHANICAL GAME APPARATUS
Filed May 25, 1934   12 Sheets-Sheet 12

INVENTOR
Homer S. Williams
BY W. S. McDowell ATTYS

Patented Nov. 9, 1937

2,098,410

UNITED STATES PATENT OFFICE 2,098,410

MECHANICAL GAME APPARATUS

Homer S. Williams, Youngstown, Ohio, assignor to Pace Manufacturing Company, Inc., Chicago, Ill., a corporation Application May 25, 1934, Serial No. 727,505

34 Claims. (Cl. 273—86)

This invention relates to improvements in mechanical game apparatus and, with reference to certain of its more specific aspects, refers particularly to an improved racing game wherein a plurality of miniature racing objects, under the automatic operation of the machine, are advanced along a raceway in a manner closely simulating the sport of horse racing, and wherein provision is made for advancing the objects in varied racing sequences so that the winning racing object of a given race will be unknown by the players of the game at the start of such a race.

I am aware of the fact that it has been proposed heretofore to provide miniature racing games wherein the racing objects or figures are advanced by the employment of electro-responsive means actuated through suitable switches and solenoids. Such apparatus, however, is subject to the objection that it contains numerous small, delicate and sensitive parts which in sustained use of the apparatus, become out of order and require frequent adjustment, replacement and repair.

Hence, it is one of the outstanding objects of the present invention to provide an automatic racing game apparatus which is characterized by its sturdiness and mechanical reliability when put to extended and prolonged periods of use, to the end that it may be operated successfully by many players and will be capable of receiving the wear and abuse of sustained service without loss of its mechanical efficiency and complete operability.

It is another object of the invention to provide racing game apparatus embodying a plurality of independently mounted racing objects adapted to be advanced back and forth over a horizontal raceway, and wherein the operation of each of the racing objects is governed by pneumatic bellows which are expanded and contracted in variable order to impart intermittent advance motion to said objects in a racing direction along said course, the operation of said bellows being effected through the provision of a perforated roll or strip which governs, in turn, the operation of a valve mechanism associated with said bellows, whereby the latter are at intervals subjected to partial vacuum conditions to control their collapse and expansion.

A further object of the invention resides in the provision of a pneumatic valve system disposed at the race completing end of said course, whereby the racing object which first completes its travel of the racing course, will effect automatically the operation of the valve system to operate return carriage mechanism by which the racing objects or figures are returned to their normal starting positions at the head of the course.

Other objects of the invention reside in the provision of an improved coin or token operated mechanism by which the operation of the game apparatus is initiated; in the provision of mechanism of a permutable character which is automatically varied so that the racing sequences of said objects or figures may be so varied for each given racing cycle that it will be impossible for the players to foretell which of the racing figures will be the first to complete a given race, and various other objects and advantages which will be in part obvious and in part pointed out hereinafter.

For a further understanding of the invention, reference is to be had to the following description and to the accompanying drawings, in which has been set forth a single but preferred embodiment of the invention.

In said drawings:

Fig. 5 is a detail sectional view in a vertical plane disclosing one of the racing objects, its supporting means and associated bellows and valve mechanism for effecting advancement of the racing object along a longitudinal raceway;

Fig. 6 is a detail sectional view indicated by the line VI—VI of Fig. 5;

Fig. 7 is a vertical transverse sectional view taken through the supporting mechanism for one of the racing objects on the plane indicated by the line VII—VII of Fig. 5;

Fig. 8 is a detail sectional view through the tracker bar mechanism employed in connection with the perforated paper roll;

Fig. 9 is a view in side elevation of the coin or token receiving mechanism employed by the present invention, the plane of the figure being indicated by the line IX—IX of Fig. 3;

Fig. 10 is a similar view looking toward the front side of the coin or token receiving apparatus, the plane of the figure being indicated by the line X—X of Fig. 3;

Fig. 11 is a bottom plan view of the token carriage, as disclosed from the plane XI—XI of Fig. 10;

Fig. 12 is a detail horizontal sectional view of the coin or token discharge chute, as taken on the line XII—XII of Fig. 10;

Fig. 13 is a vertical transverse sectional view taken through the token receiving mechanism and associated bellows on the plane indicated by the line XIII—XIII of Fig. 9;

Fig. 14 is a detail vertical sectional view on the vertical plane indicated by the line XIV—XIV of Fig. 3, and disclosing the position of the racer return carriage when the latter reaches a secondary position at the rear or finishing end of a raceway;

Fig. 15 is a similar view disclosing the racer carriage in its primary position at the forward or starting end of a raceway, the plane of the figure being indicated by the line XV—XV of Fig. 3;

Fig. 16 is a detail top plan view of the valve box mechanism arranged at the finishing end of the raceway, the plane of the figure being disclosed by the line XVI—XVI of Fig. 2;

Fig. 17 is a detail vertical sectional view on the plane XVII—XVII of Fig. 3 and disclosing in vertical cross section the suction inlet of the valve assembly of the racer bellows;

Fig. 18 is a vertical longitudinal sectional view through the valve mechanism of the racer bellows on the plane indicated by the line XVIII—XVIII of Fig. 17;

Fig. 19 is a vertical longitudinal sectional view taken through the valve box disclosed in Fig. 16 on the plane indicated by the line XIX—XIX of Fig. 16;

Fig. 20 is a detail vertical longitudinal sectional view taken through the valve box disclosed in Fig. 16 on the plane indicated by the line XX—XX of Fig. 16. In this figure there is also disclosed one of the pivoted flag members for indicating a winning racer;

Fig. 21 is a detail perspective view of one of the pivoted flag members;

Fig. 22 is a horizontal sectional view on the plane indicated by the line XXII—XXII of Fig. 2 and disclosing more particularly the distributing head for governing the actuation of the several bellows used in the operation of my improved game apparatus.

Fig. 23 is a vertical sectional view taken through the distributing head at the suction end thereof on the plane indicated by the line XXIII—XXIII of Fig. 22;

Fig. 24 is a similar view on the plane indicated by the line XXIV—XXIV of Fig. 22 in which the distributor head is shown in longitudinal section;

Fig. 25 is a vertical transverse sectional view through the distributor head on the line XXV—XXV of Fig. 22;

Fig. 26 is a similar view on the line XXVI—XXVI of Fig. 22;

Fig. 27 is a fragmentary top plan view of the cabinet disclosing the "pay-off" indicator;

Fig. 28 is a vertical longitudinal sectional view on the plane indicated by the line XXVIII—XXVIII of Fig. 27;

Fig. 29 is a vertical transverse sectional view on the plane as indicated by the line XXIX—XXIX of Fig. 27;

Fig. 30 is an end elevation of the racer carriage and one of its supporting bars, and disclosing the trigger mounted in connection with said carriage for the automatic opening of an associated valve;

Fig. 31 is a vertical transverse sectional view on the plane indicated by the line XXXI—XXXI of Fig. 30;

Fig. 32 is an elevational figure of the mercury switch and its operating means;

Fig. 38 is a wiring diagram showing the electrical hook-up of the motor and the switches therefor;

Fig. 39 is a side elevation of the apparatus employed in closing the valve mechanism at the completing end of the course.

Figure 4:
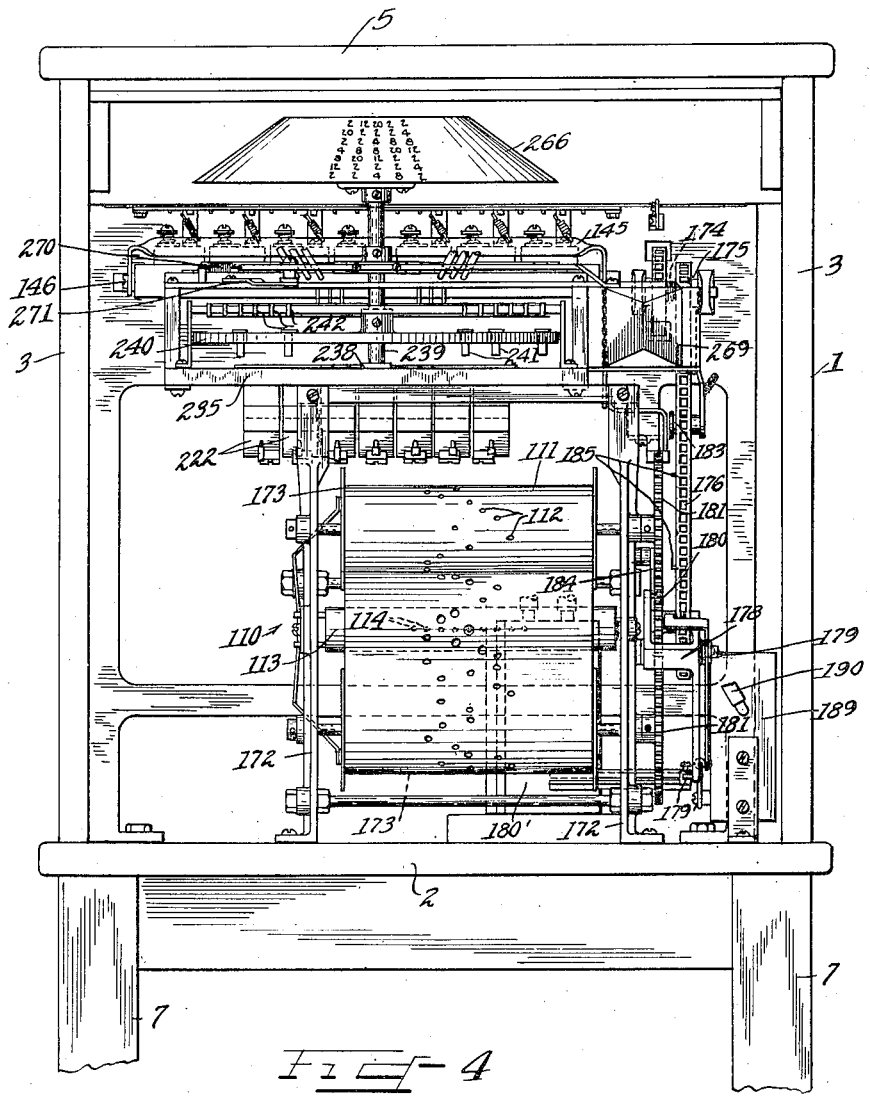
Fig. 4 is a rear elevation of the game apparatus with the rear end wall of the cabinet removed to disclose the internal mechanism mounted within the cabinet. In this figure there is disclosed the rotatable odds estimating disc together with the perforated paper roll mechanism which governs the operation of the racing objects through pneumatic features of control.

Referring more particularly to the drawings, the numeral 1 designates a cabinet of suitable configuration, but which in this instance comprises a bottom wall 2 arranged in a substantially horizontal plane, upstanding vertical side walls 3—3, vertical end walls 4—4 and a top wall 5, in which is disposed a horizontal transparent panel 6. The cabinet may be supported, as shown in Fig. 4, by means of depending legs 7 of suitable height and configuration, or the cabinet may be placed directly on a table, counter or other form of support, with the bottom wall 2 resting directly on the upper surface of such a support.

Figure 1:
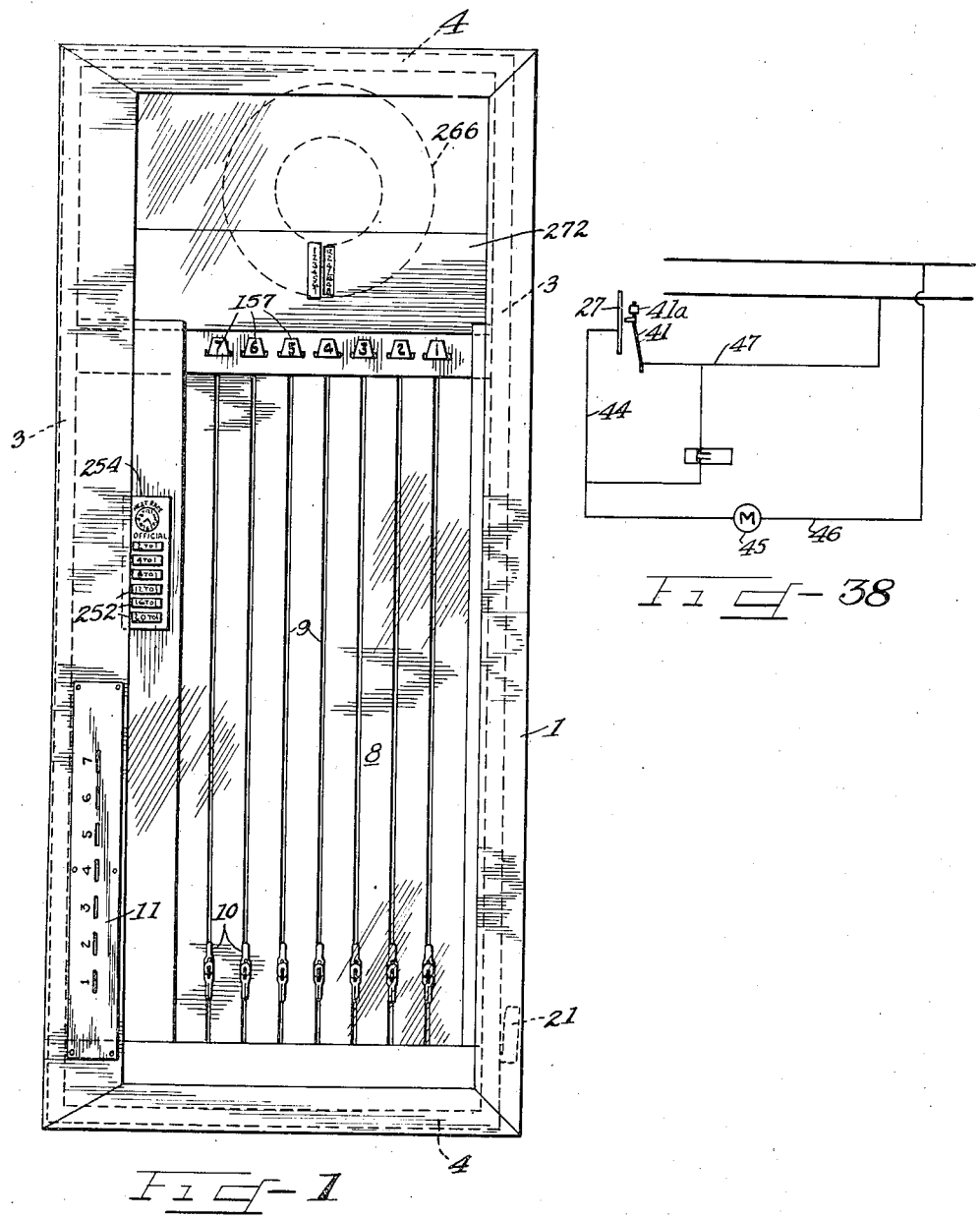
Fig. 1 is a top plan view of the cabinet in which my improved racing game apparatus is contained, there being set forth in this figure the transparent top of the cabinet through which can be viewed the racing objects and their longitudinally extending raceways.

As shown in Fig. 1 particularly, the cabinet is provided below the panel 6 with a horizontally disposed longitudinally extending raceway 8, in which is provided a plurality of transversely spaced longitudinally extending slots 9, in which slots operate the supports for a plurality of independently movable racing objects 10. These racing objects may be of any suitable design. In the present instance, they have been shown in the form of figures simulating running horses with riders arranged thereon. It is obvious however, that these racing objects may be in the form of automobiles, motorcycles, dogs or the like, without departing from the spirit and essential mechanical features of the invention.

At the beginning of a game, the racing objects occupy positions in the slots 9 contiguous to the front end of the cabinet, as shown in Fig. 1. By the provision of improved pneumatic means, hereinafter described in detail, the racing objects are advanced longitudinally of the slots 9 with first one of the racing objects leading and then another until one of said racing objects reaches the far ends of the raceway and thereby automatically terminates a given race. By the provision of my improved pneumatic control for these racing objects, a great variety of sequence of the operation of the racing objects is obtainable, so that it will be virtually impossible for even the most experienced user of the apparatus to determine in advance the winning racing object of a given race. The release of the racing objects is effected primarily through the deposition of one or more tokens or coins within the apparatus, and it will be understood that by the term token, I include not only coins but specially designed checks, plates, disks and other suitable flat metallic objects which may be employed in initiating the operation of the machine.

The token receiving apparatus comprises a stationary, slotted, escutcheon plate 11, which is mounted as shown in Fig. 1 at the top of the cabinet and along one side thereof. This escutcheon plate contains a number of longitudinally aligned slots, preferably individually identified by numbers or otherwise, for the reception of coins or tokens, the number of the slot being preferably corresponding with the number of the racing objects on the raceway 8. As shown in Figs. 9 to 11 inclusive, there is arranged beneath the top wall 5 of the cabinet and adjacent to one side thereof, a channel shaped stationary frame member 12 which effects the sliding support of a token carriage indicated at 13 and which is normally disposed immediately below the escutcheon plate 11. The carriage 13 is provided with spaced slots normally disposed in registration with the token slots of the plate 11 and a token, inserted through the slots of the plate 11 drops into the box of the carriage 13, where it is momentarily retained prior to initiating the operation of the apparatus. This is accomplished by providing the under part of the token carriage, as shown particularly in Fig. 11, with a bar 14 provided with elongated slots 15 in which are positioned fastening appliances 16. A spring 17 is connected wth the bar 14 and the frame of the carriage 13 and normally holds the bar 14 so that the recesses 18 thereof are maintained slightly out of registration with the slots in the carriage, this lack of registration being sufficient to prevent the coin or token from passing through the token carriage when initially deposited therein.

Journaled horizontally in connection with the frame structure 19 within the cabinet is a horizontally extending actuating shaft 20. This shaft projects through one side of the cabinet, as disclosed in Figs. 1 and 3, and its exteriorly projecting end is equipped with a manually operated handle 21 which, following the insertion of tokens into the carriage 13, is depressed in order to partially rotate the shaft 20. Within the cabinet, this shaft is formed with a crank arm 22 having its upper end pivotally connected with a link 23, the opposite end of the latter being connected with an ear 24 depending from the carriage 13. The rocking of the shaft 20 therefore imparts longitudinal movement and also lateral movement to the token carriage, the lateral movement being effected through the provision of angularly disposed arms 25 provided with slots, the said arms being formed with the token carriage and having the slots thereof disposed to receive studs 26 projecting upwardly from the framework used in the support of the token carriage.

This forward and lateral movement of the token carriage brings the same into vertical registration with a coin or token head 27 mounted stationarily within the cabinet. When normally positioned, the token carriage is out of registration with the token head, as shown in Fig. 13, but upon the actuation of the shaft 20, the forward and lateral travel of said carriage registers the token slots formed therein with corresponding slots 28 provided in the coin head. The coins or tokens arranged within the slot of the carriage 13 are then released by the contacting of the lip 29, formed at one end of the bar 14, with a stationary part of the coin head 27. This reciprocates the bar 14 a limited distance within the limits of the slots 15 and against the resistance of the spring 17, so that the recesses of said bar are aligned with the slots of the token carriage. This operation, therefore, releases the coins or tokens from the carriage and allows them to drop into the slots 28 of the coin head. When the handle 21 of the shaft 20 is released, the shaft 20 and the token carriage return to normal positions automatically under suitable spring action.

Figure 2:
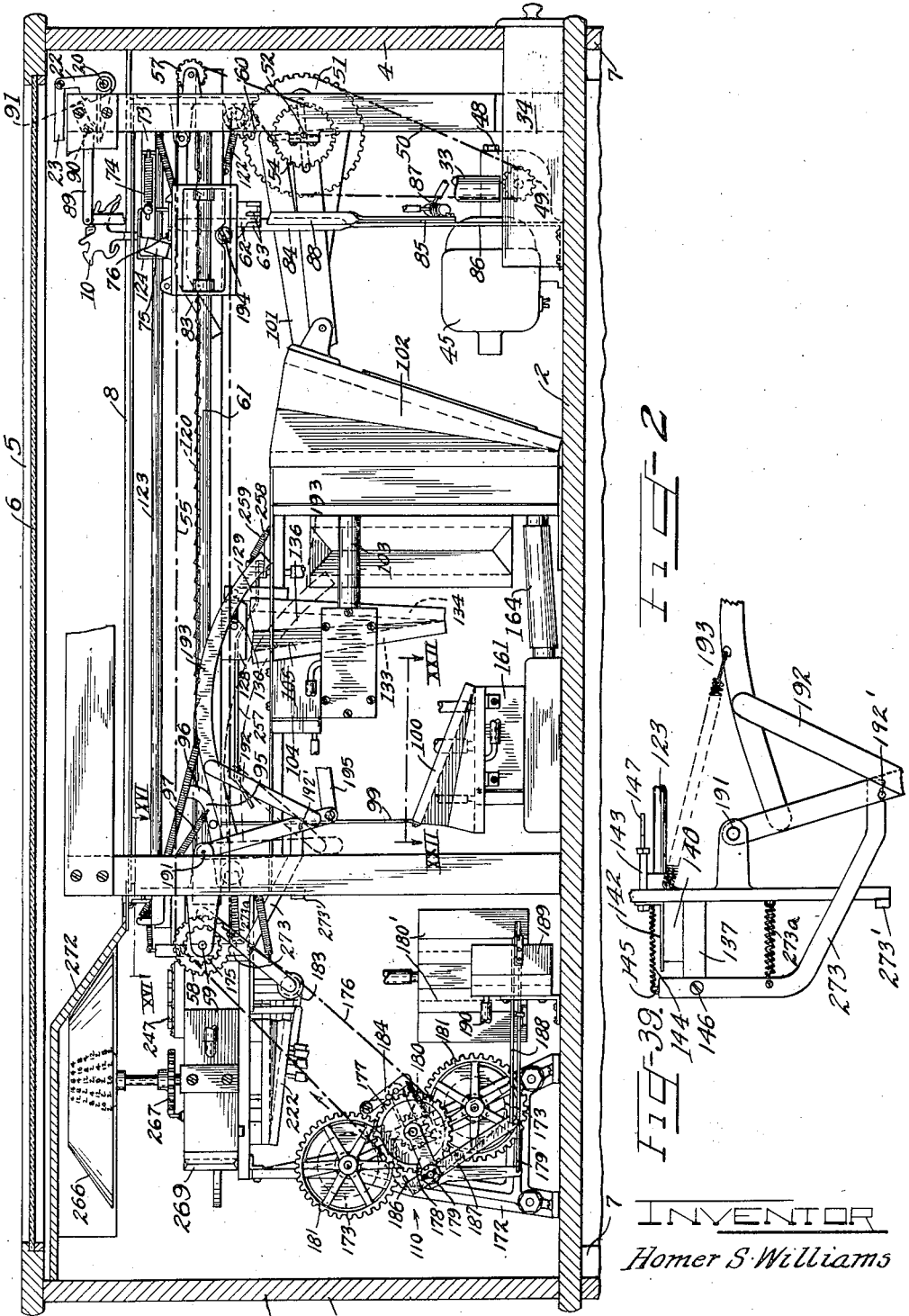
Fig. 2 is a vertical longitudinal sectional view taken through the cabinet and disclosing mainly in side elevation the apparatus employed for effecting through pneumatic control the operation of the racing objects and ancillary devices.

The coin head embodies inner and outer plates 30 and 31 respectively, which produce a plurality of spaced vertical slots 28, the bottoms of said slots being in communication with an inclined runway 32 by which the coins or tokens are delivered on edge and by the action of gravity to the upper end of a vertically extending tube 33 which leads to a token or coin drawer 34, or other closed type of compartment, as disclosed in Fig. 2.

The outer plate 31 of the coin head, that is, the plate which is arranged immediately adjacent to one of the side walls 3 of the cabinet, is provided, as shown in Fig. 10, with upper and lower sets of arcuate slots 35 and 36 respectively. Receivable within these slots for limited oscillatory movement are the laterally directed terminals 37 of a pair of token supporting arms 38 and 39 for each of the slots 28. These arms are united by means of springs 40 by means of which the terminals 37 are maintained in the ends of the slots 35 and 36, that is, in positions which will obstruct the downward passage of a coin or token through the slots 28. Thus when a token is first deposited in one of the slots 28, it will engage with the terminal 37 of the upper arm 38 of the slot in which it is received, as shown more particularly at A in Fig. 9. This may be termed the primary coin position which a coin or token will occupy when first deposited in the coin head.

When a coin or token reaches the position A in the coin head, it will engage with one of a plurality of resilient contact members 41 mounted on the plate 31, the said contact members being mounted on an insulating strip 42 and having their upper ends arranged to project through vertical slots 43 formed in the plate 31, so that said contact members may directly engage with the coins or tokens inserted into the coin head when the coins or tokens occupy their initial or primary position within said coin head. Insulators 41a are provided at the upper end of each contact member 41 to prevent short-circuiting. This results in the completion of an electric circuit as disclosed diagrammatically in Fig. 38. In this figure, the coin head has been disclosed as connected with a wire 44 leading to a motor 45, thence by way of a return conductor 46, to the source of current supply. Another conductor 47 leads from the source of current supply to a contact member 41, whereby when the latter is in engagement with a token or coin positioned within the coin head, the motor circuit will be completed, thereby causing the operation of the motor.

As disclosed in Fig. 2, the motor 45 may be mounted on the bottom wall 2 of the cabinet and its rating is such that it may be operated with the use of those circuits of normal voltage. The armature shaft of the motor is connected with a speed reducing gear housing 48 by means of which the high speed of such a motor may be reduced to conform to the requirement of the apparatus comprising the present invention. In this instance, however, one side of the gear housing 48, through which a driving shaft projects, is equipped with a sprocket 49, around which passes an endless chain 50, which is also trained over a larger sprocket 51 fixed upon one end of a crank shaft 52, disclosed more particularly in Figs. 2 and 3, the said crank shaft being suitably supported for rotation in connection with bearings 53 carried in connection with the frame structure 19.

Mounted on the crank shaft 52 at the other end of the latter as regards the sprocket 51 is a second sprocket 54, shown more particularly in Fig. 15, and trained around the sprocket 54 is an endless chain 55, which is employed for effecting the operation of a racer return carriage 56. The chain 55 has its upper run, after passing around the sprocket 54, trained over an idler sprocket 57 and thence forwardly and longitudinally of the machine until it engages with the teeth of a sprocket 58 mounted on a foot shaft 59 journaled horizontally and transversely of the machine at the race terminating end of the raceway 8. After passing around the sprocket 58, as shown in Fig. 14, the lower run of the chain 55 extends horizontally and longitudinally throughout the greater portion of the length of the cabinet and before engaging with the teeth of the sprocket 54, the said lower run of the chain 55 engages with a second idler sprocket 60, carried in conjunction with the frame structure 19. It will be seen that the placing of a coin or token in the coin head completes a primary circuit in which the motor 45 is situated, causing the operation of said motor, the rotation of the crank shaft 52 and the positive drive or movement of the chain 55, the latter being mounted in the upper regions of the cabinet to one side of the raceway 8.

The carriage 56 comprises a frame which is mounted for longitudinal sliding movement on a stationary rod 61 extending the full length of the frame structure 19. Slidably carried by the carriage for limited vertical travel with respect thereto is a stirrup 62, provided with vertically disposed tines 63 which are adapted to be automatically shifted into and out of engagement with the upper and lower run of the chain 56 so that the carriage may be moved longitudinally of the cabinet. Pivotally mounted on the side of the carriage is an oscillating fork 64. One arm of this fork is slotted at its end for the reception of a headed pin 65 projecting from the stirrup 62, so that the oscillation of the fork 64 about its pivotal center 66 will serve to shift the stirrup vertically, causing its clutching engagement with either the upper or lower run of the chain 55. The fork is also formed with a shorter arm 67 which terminates in reversely inclined wedge shaped surfaces 68, the latter being arranged for engagement with a stud 69 projecting stationarily and laterally from a depending arm 70 which is pivotally mounted at its upper end as at 71 in connection with the carriage frame, the lower end of the arm 70 being connected by means of a spring 72 with the carriage frame.

The spring 72 serves to normally maintain the stud 69 in positive engagement with one or the other of the wedge surfaces 68 of the fork 64, thereby securely retaining the stirrup 62 in clutched engagement with the upper or the lower of the chain runs 55. At the starting end of the cabinet, the frame structure 19, as shown in Fig. 15, is provided with a forwardly directed bar 73 which receives at its outer end a resilient stop 74 disposed in the path of movement of the upwardly extending arm 75 of the fork 64, whereby when the carriage 56 returns to its original or starting position, the fork is actuated to automatically shift the stirrup 62, by the engagement of the arm 75 with the stop 74, so that the stirrup will be properly clutched with the chain 55 in order to be in condition for forward movement when the machine is next actuated.

Connected with the carriage 56 for movement in unison therewith and extending transversely across the cabinet immediately below the raceway 8 is a bar 76, which is arranged immediately in front of the support for the raceways 10 and is adapted when the carriage returns from a race finishing to a race starting position to engage with the racers and restore them to the positions disclosed in Fig. 1. The end of the bar 76 remote to the carriage 56 terminates in a downwardly directed extension 77, as shown in Figs. 30 and 31. This extension is formed with vertically spaced studs 78 which are adapted to engage with the upper and lower edges of a longitudinally extending stationary guide strip 79, suitably supported in connection with the internal cabinet frame structure 19. When the carriage 56 occupies the position disclosed in Fig. 15 at the beginning or start of a race, the under side of the lug 76a on the carriage 56 engages with a pivotally mounted spring pressed lever 80, which is pivotally carried as at 81 in connection with the frame structure 19 and has its upper edge positively maintained in contact with the lower surfaces of the lug 76a by means of a coil spring 82, the outer end of the lever 80 terminating in a downwardly directed cam-shaped extension 83.

Connected with the lever 80 is a depending link 84 which, as shown in Fig. 32, has its lower end pivotally connected with an arm 85, which in turn is pivotally mounted on the upper end of a vertical bracket 86 arising from the bottom wall 2 of the cabinet. Carried by the arm 85 is a rockable mercury type switch 87, which is employed for effecting the major portion of the control of the circuit for the motor 45. As previously stated, the motor circuit is energized by the insertion of a token or coin in the coin head and into engagement with the contact member 41. This effects the operation of the motor and the immediate movement of the chain 55, which results in the advancement of the carriage toward the rear or finishing end of the raceway 8. The initial movement of the carriage from its primary position at the head of the raceway toward its secondary position at the foot of the raceway, removes the bar 76 from engagement with the lever 80, thereby allowing the latter to respond to the action of the coil spring 82, lifting the link 84 and rocking the arm 85 so that the switch 87 is moved to a position of circuit closure and maintained in that position by the influence exerted by the coil spring 82 on the lever 80.

This therefore renders the coin head contact members in a large sense independent of motor control so that the coins or tokens inserted in said head may be moved to different operating or discharge positions without effecting the operation of the motor. Also connected with the arm 85 is the lower end of a second link 88, see Fig. 32, which has its upper end pivotally connected with an arm 89, the intermediate portion of the latter being pivotally mounted as at 90 in connection with the frame structure 19, and the outer or other end of said arm 89, upon the movement of the switch 87 to the position of circuit closure, will engage with a shoulder 91 formed in connection with the crank arm 22 carried by the shaft 20, thus locking the token carriage against further operation while a given race is being run or while the parts are being returned to primary operating positions.

As stated, the initial operation of the motor 45 results in the immediate movement of the carriage 56 from its primary to its secondary position and this occurs before the advancement of the racer along the raceway 8. When the carriage reaches the secondary position disclosed in Fig. 14 with the stirrup 62 having the tines 63 thereof in engagement with the lower runs of the chain 55, the arm 75 of the fork 64 engages with a permanent stop 92 formed in connection with a stationary frame member 93. This results in moving the fork to its neutral position, that is, to a position wherein the tines 63 of the stirrup 62 are out of engagement with both the upper and lower runs of the chain 55, thereby arresting the operation for further longitudinal advance of the carriage 56. The carriage is retained in this position by a spring pressed latch 94 carried by the frame member 93, and which latch has its outer end recessed to engage with the upper portion of the arm 70. Also fastened to the frame member 93 is an arm 95 formed with a curved outer rim 96 and supported by a coil spring 97 so that the under portion of the arm 95 is normally out of engagement with a stud 98 projecting stationarily from the stirrup 62. The arm 95 is connected by means of a rod 99, as shown in Fig. 2, so that when it is desired to restore the carriage to its primary or starting position, and to thereby restore all of the racers 10 to their primary or starting positions, the bellows 100 is collapsed, by means hereinafter described, which pulls down on the arm 95 and causes the latter to contact with the stud 98 on the stirrup 62, thereby forcing the stirrup downwardly so that the upper set of teeth thereof will engage with the upper run of the chain 55, at the same time shifting the position of the fork 64 accordingly so that the power of the chain 55 may be used for returning the carriage to its primary position.

The cranks of the crank shaft 52 are connected by means of links 101 with a group of power actuated suction-producing bellows 102, constituting what may be termed the "power plant" of the system. Leading from the suction side of bellows 102 is a conduit 103 which extends to the valve housing 104 of a plurality of racer bellows 105, there being one of the latter for each of the racers 10. As shown more particularly in Figs. 17 and 18, the housing 104 includes a longitudinally extending lower chamber 106 which is normally in open communication with the suction conduit 103. Above the chamber 106, the housing 104 is provided with a plurality of compartments 107, individually separate, which communicate by means of ports 108 with their respective bellows 105. Normally closing valve ports establish communication between the chamber 106 and the compartments 107 have valves 109 which, due to the suction in the chamber 106, remain tightly seated. To govern the opening and closing of the valves 109 to produce alternating collapsing and expanding of the racer bellows, the present invention provides, as disclosed in Figs. 4 and 8, a perforated paper roll mechanism 110 which is of the type employed in connection with automatic or semi-automatic player pianos, organs and other types of musical instruments. Such a mechanism embodies broadly a roll or strip of paper 111 provided with variably spaced perforations 112 together with rolls or drums by means of which the paper is passed over what is known as the tracker bar, as indicated at 113 in Fig. 8. This tracker bar is provided with ports 114 which are adapted to register intermittently with the variably spaced perforations provided in the paper strip 111 and from ports 114, tubes 115 extend to passages 116 formed in the housing 104 and which passages lead to the underside of flexible diaphragms 117 which have their circumferential edges secured to the bottom wall of the chamber 106.

By this construction, it will be seen that as the perforated paper strip 111 moves past the tracker bar 113, areas of high pressure will be set up on the under side of the diaphragms 117, inasmuch as the chamber 106 is normally maintained at subatmospheric pressure. This causes the flexing or raising of the diaphragms 117 with which the lower portions of the valves 109 are engaged, causing the unseating of said valves and the movement of the upper headed portions 118 thereof into closing engagement with openings 119 by means of which the compartments 107, as well as the interior of the bellows 105, communicate with the atmosphere. The simultaneous raising of the valves 109, accompanied by the closing of the openings 119, enables the suction generated by the primary bellows 102 to be transmitted by way of the conduit 103, the chamber 106, the compartments 107 and ports 108 to the interior of the racer bellows 105, thereby causing the collapse of the latter under the influence of outside atmospheric pressure.

The stems of the valve 109 are preferably cross shaped in configuration as shown in Fig. 6, so that while said valves are elevated to establish communication between the chambers 106 and the interior of the bellows 105, air flow past said stem may be readily effected. When the valves are in their elevated positions, the heads 118 thereof close the openings 119, thereby cutting off atmospheric communication. The openings 119 are normally covered by a channel member 131, which protects the interior of the valve housing from the entrance of dust, dirt or the like. The chamber 106 may, as shown in Fig. 5, communicate with each of the compartments 116 through restricted bleeder passages 132, as is customary in apparatus of this character. The bellows 105 is of the usual type, embodying a stationary wall 133 and a movable wall 134, the two walls being joined along their lower edges by a flexible connection 135, and having their sides and upper edge portions connected by the fabric panels 136. The valve housing 104 is connected directly with the stationary walls 133 of the bellows, thereby allowing for freedom of movement on the part of the movable walls 134.

The bellows 105 expand and contract as the perforations in the paper strip moves past the tracker bar 113. Whenever one of the bellows 105 is collapsed, movement is imparted in an intermittent lineal manner to one of a plurality of parallel spaced longitudinally extending notched bars 120, which are supported in connection with the frame structure 19, as shown in Fig. 5, and are arranged immediately beneath each of the racing objects 10. At their forward ends the upper edges of the notched bars 120 are provided with spaced stationary stops 121 arranged on opposite sides of the frame structure 19. These stops serve to limit the reciprocatory motion of the notched bars. To each of the bars 120 there is connected a coil spring 122, which normally serves to retain the bar with which such a spring is connected in a retracted position.

Arranged above the notched bars 120 and below the plate which forms the raceway 8, is a series of stationary rods 123 which are positioned substantially in vertical alignment with the longitudinal slots 9. Slidably mounted on the rods 123 are substantially inverted U-shaped brackets 124, which provide support for the racing figures indicated at 10. The legs of the brackets 124 are of unequal length, the longer leg being arranged to engage with the sides of the complemental notched bar 120, so that rotation of the bracket will be precluded. Slidably supported by the rods 123 adjacent to the shorter leg of the bracket 124 are plates 125 which are connected by coil springs 126 with the longer legs of the bracket 124, as shown more particularly in Figs. 5 and 7. Also connected with the plates 125 are gravity actuated detents 127, the lower ends of which engage with the teeth provided on the upper edges of the notched bars 120. Formed with the lower edge of each of the notched bars is a stop member 128 with which engages a finger 129 carried by each of the racer bellows 105, a coil spring 130 serving to retain each of the fingers 129 in constant engagement with the end of a cooperative stop member 128.

By this arrangement, it will be manifest that when the paper roll 111 moves past the tracker bar, the perforations in the paper roll 111 will admit atmospheric air into the valve housing 104 in accordance with the staggered order of the roll perforations. These perforations are arranged in such number as to correspond with the number of the racer bellows, but are variably spaced longitudinally of the roll, so that as the latter moves past the tracker bar, first one and then another of the racer bellows will be collapsed to effect the reciprocation of the notched bar 120 associated therewith. The reciprocation of the bars 120, of course, imparts movement to the racing objects 10 by the provision of the brackets 124, used in the support of said racing objects, and the detents 127 which transfer the motion of the notched bars to said brackets when the bars are reciprocated in one direction.

The plates 125 act as a brake and prevent the momentum of the associated racers from carrying the latter too far. This causes the intermittent advance of the racers longitudinally of the slots 9, until one of said racers arrives at a race finishing position. The winning racer is employed to automatically terminate the operation of the racer bellows, to operate means to denote the number of the winning racer and to provide for reverse reciprocation of the carriage 56 from its secondary to its primary position, in order that all of the racers will be restored to their initial or starting positions at the forward end of the raceway. It will be noted that the transverse bar 76 of the carriage 56 will be disposed to engage with the detents 127 upon return movement of the racer carriage. This will lift the detents out of engagement with the notched bars 120 to permit of free sliding movement of the brackets 124 in a return direction along their supporting rods 123.

Referring now to Figs. 16, 19 and 20, there is arranged at the race terminating end of the raceway 8, and supported in connection with the stationary frame member 93 of the frame structure 19 a valve box 137. In this valve box there is formed a longitudinally extending chamber 138, with which communicate a plurality of spaced ports 139. Normally arranged to cover these ports are oscillatory valves 140, which are arranged on the upper surface of the valve box 137 and turn about vertical axes 141. Connected with the upper surface of each of the valves 140 is a metallic bracket 142, and to the upstanding legs of each of these brackets there is connected a horizontally disposed shoulder rod 143, these rods being slidably received in bearing openings provided in the stationary frame structure 19. Coil springs 144 have their forward ends connected with the vertical legs of the brackets 142, and the rear ends of these springs are connected with a pivotally mounted bail 145, which is pivoted as at 146 in connection with the valve box. Normally, this bail assumes a stationary position in a substantially vertical plane, as indicated in Figs. 16 and 20. To retain the valves 140 in their normal positions covering the ports 139, and to overcome the resistance of the springs 144 which normally act to swing the valves 140 to a position uncovering the ports 139, the frame structure 19, or the member 93 thereof, is provided adjacent to the valve box with a plurality of shouldered fingers 147. These fingers are pivoted as at 148 and are connected by means of coil springs 149 with a stationary part of the frame structure so that the shouldered portions of said fingers will engage with the shouldered outer end of the rod 143 in order to releasably hold the valves 140 in their positions closing the ports 139.

In the operation of the valve box mechanism, it will be observed that when one of the racers 10 arrives at the end of the raceway, thereby completing a given race, the supporting bracket 124 thereof will, as shown in Fig. 16, engage with one of the fingers 147. This causes the oscillation of the engaged finger against the resistance of a spring 149, with the result that the finger is moved to a position removing its shoulder from engagement with the shouldered outer end of the rod 143 connected with an associated controlling valve 140. This permits the spring 144 engaged with the release rod to move the release valve to a position wherein the port 139 governed thereby is opened, so that air under atmospheric pressure may enter the chamber 138 of the valve box.

Extending from the chamber 138 to one end of the valve housing 104, is a tube 150. This tube connects the chamber 138 with a passage 151 formed in the housing 104 and which passage terminates immediately beneath a flexible diaphragm 152, which is supported within the housing 104 contiguous to one end thereof, as disclosed in Figs. 17 and 18. The upper side of the diaphragm 152 is in open communication with the sub-atmospheric pressures prevailing in the chamber 106 of the housing 104, and in fact the diaphragm 152 is located immediately adjacent to the conduit 103 which connects the bellows 105 with the suction producing bellows 102. Therefore, whenever the chamber 138 is open to the atmosphere, air under atmospheric pressure passes through the tube 150 and exerts pressure on the diaphragm 152, causing the elevation of the latter. This movement of the diaphragm 152 is employed for effecting the operation of a flap valve 153. This flap valve is arranged in a compartment 154 which communicates with the chamber 106 of the housing 104 by way of a vertical opening 155. Normally, the flap valve 153 drops by gravity on the top of the diaphragm 152. However, when one of the oscillating valves 140 is moved to a position uncovering one of the ports 139, air passes under atmospheric pressure by way of the open port 139, the chamber 138 and the valve box 137, thence by way of the tube 150 to the under side of the diaphragm 152, causing the elevation of the latter and the closing of the opening 155 by the sealing engagement of the flap valve 153 with the bottom portions of said opening. This operation, therefore, results in the cessation of movement on the part of the racer bellows 105 and brings the racers to a stand-still until the carriage 56 returns them to their original starting positions.

At the end of the raceway 9, and viewable through the transparent panel 6 of the cabinet, is disposed a plurality of winner indicating flags 157. These flags comprise stamped sheet metal members, as disclosed in Figs. 20 and 21, each of which includes down-turned perforated ears 158 adapted for the reception of pivot pins 159. Also, each flag includes a down-turned tongue 160, which is arranged in the path of movement of the bracket 142 of the valves 140, so that when one of said valves is released by the operation of a winning racer, its movement in response to the action of a spring 144, results in causing the bracket 142 connected therewith to engage with the depending tongue 160 of an associated flag, causing the latter to revolve from a substantially horizontal position, as shown in full lines in Fig. 20, to an elevated or substantially vertical position, as disclosed by broken lines in Fig. 20, thus providing a means by which the operator of the apparatus may be notified immediately and positively as to the winning racer.

In order to effect the operation of the bellows 100 and to thereby return the carriage 56 and the racers 10 to their original starting positions, there is arranged adjacent to the bellows 100 a suction distributor 161, which has been shown in detail in Figs. 22 to 26 inclusive. This distributor comprises a casing in which is formed a longitudinally extending horizontally disposed chamber 162, one end of which communicates with a right angular passage 163 which is joined by means of a conduit 164 with the main power plant bellows 102, so that normally a suction or sub-atmospheric pressure will obtain in the chamber 162. Arranged above the chamber 162 are a plurality of compartments 165, which are normally out of communication with the chamber 162 by means of a plurality of valves 166, there being one of said valves for each of said compartments so that individual control of the communication between said chamber 162 and the respective compartments 165 may be obtained. The valves 166 are provided with cross-shaped stems 167 and engage at their lower ends with the central portions of flexible diaphragms 168. Beneath these diaphragms are provided passages 169 which, due to features of control hereinafter described, are adapted to receive air under atmospheric pressure for the purpose of flexing the diaphragms 168 upwardly, thereby unseating the valves 166 and providing for communication between the chamber 162 and the compartment 165.

Figure 37:
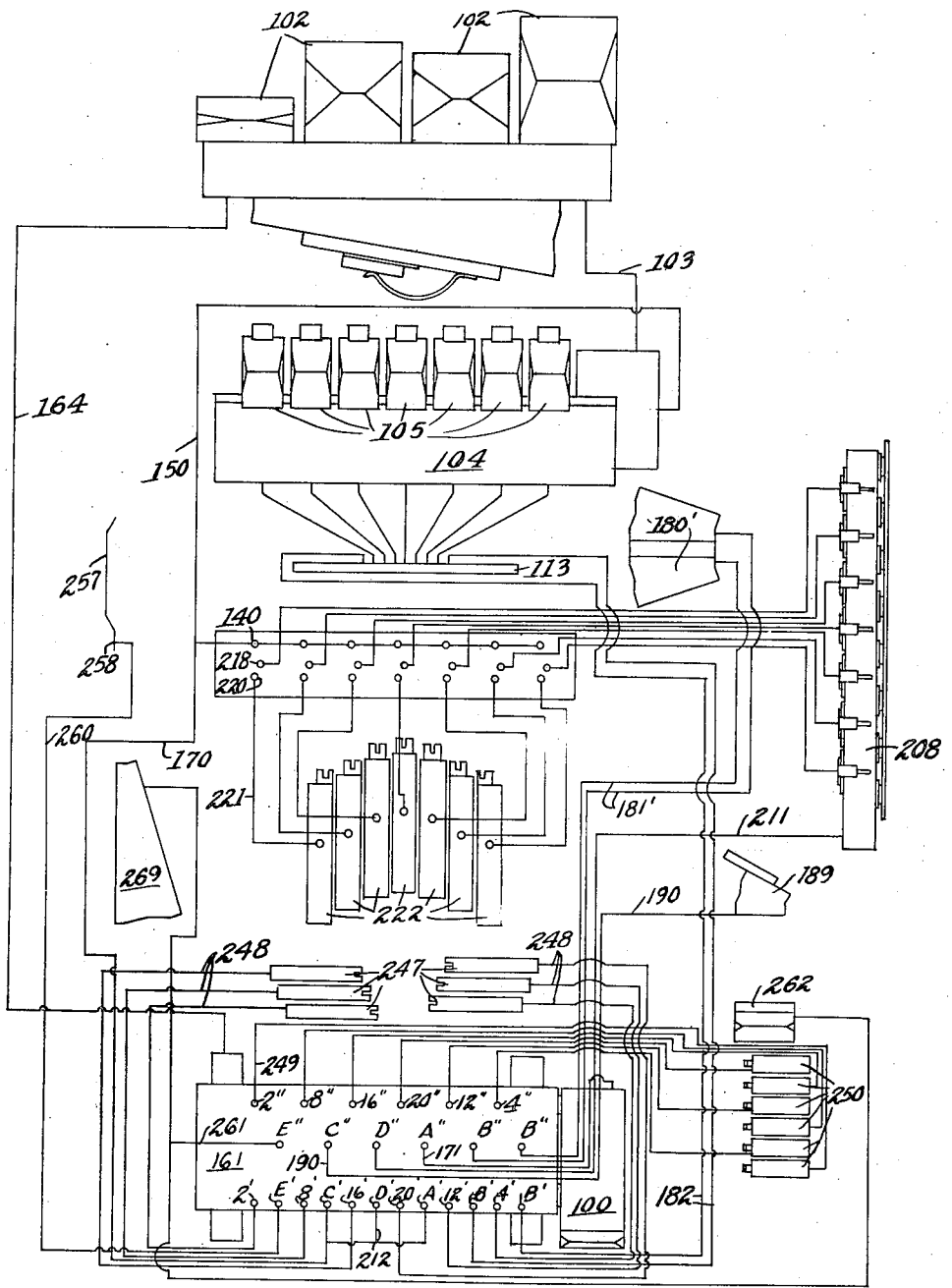
Fig. 37 is a diagrammatic view in the form of a flow chart disclosing the pneumatic means and associated pipe line or tube used in transferring pneumatic energy from one unit of the apparatus to the other.

By referring to the diagrammatic figure, 37, it will be noted that when one of the valves 140 is opened, air will be admitted under atmospheric pressure into the tube 150 which communicates with a tube 170 which extends to the passage 169 of the distributor marked A' in Fig. 37. This causes the diaphragm 168 at station A' to flex upwardly, lifting its associated valve 166 so that suction may enter the line 171 which leaves the distributor at station A'' and extends to the bellows 100, causing the collapse of that bellows due to the suction thus extended to it from the power plant 102. It has been described heretofore that when the bellows 100 is collapsed, the rod 99 is actuated in order to oscillate the fork 64 by which the clutch 62 of the carriage 56 may be engaged with the chain 55 and returned from the race finishing to the race starting position.

The perforated paper roll mechanism in the specific embodiment herein illustrated, comprises a stationary frame 172 in the upper and lower ends of which are journaled rolls 173 with which are connected the opposite portions of the perforated paper strip 111. In order to drive the roll 173, the foot shaft 59 is provided with a friction clutch 174 which, in turn, drives a sprocket 175 loosely mounted for rotation on the foot shaft. Passing around the sprocket 175 is an endless chain 176, which is also trained over a sprocket 177 journaled in connection with a supporting fork 178, the latter being pivotally mounted for swinging movement about a horizontal axis in connection with the frame 172 as indicated at 179. The fork 178 supports for turning movement in unison with the sprocket 177 a gear 180, which is adapted to mesh alternately with complemental gears 181 provided in connection with the shaft on which the rolls 173 are supported. By this arrangement, the paper roll mechanism is driven directly from the foot shaft 59.

In order to provide for the automatic reversal in the direction of drive or movement of the paper strip 111 after the latter has been practically removed from one of the rolls 173, the lower end of the fork 178 is connected by means of a link 179' with a bellows 180' of the dual type. As shown in Fig. 37, both sides of the bellows 180' are connected by means of tubes 181' with the distributor 161 at the positions marked B''—B'', the latter being on the suction side of the distributor. The corresponding terminals B'—B' are connected by means of the tubes 182 with the tracker bar 113. By this arrangement, when the paper strip 111 has been practically unwound from one of the rolls 173, a perforation in the strip at the extreme right or left thereof, and beyond the perforations which are employed for operating the racer bellows, registers with an opening in the tracker bar with which the tubes 182 are connected. This allows high pressure to pass through the tubes 182 to effect the elevation of the valves 166 in the distributor which are disposed at the station B' or B'', with the result that one or the other of the sides of the bellows 180' is operated to move the link 179 and thus throw the fork 178 to transfer the position of the drive gear 180 from engagement with one of the gears 181 to the other, so that there will take place an automatic reversal in the direction of movement of the paper strip without occasioning any interruption in the sustained operation of the machine.

The chain 176 may engage with a spring pressed idler 183 which operates to maintain the required tautness of the chain 176. The upper portion of the fork 178 cooperates with a spring pressed link 184 to positively retain the fork so that the gear 180 thereof will be maintained in driving relationship with one or the other of the gears 181.

In order to break up any definite sequence of races, the sprocket 175 is driven through the friction device 174. In addition, the chain 176 is provided at intervals with variably spaced laterally projecting lugs 185, which are disposed for engagement with a lip 186 provided on the upper end of an arm 187, the latter being pivotally supported in connection with the pivot 179. The lower end of the arm 187 is connected by means of a link 188 with a sequence varying bellows 189. This bellows is connected by means of a tube 190 with the position C" of the distributor 161, so that at proper intervals a suction may be established in the tube 190 to collapse the bellows 189. The passage 169 in registration with the position C" is indicated at C' in Fig. 37, and which is in communication with the tube 170, so that whenever one of the oscillating valves 140 is open at the conclusion of a race, the bellows 189 will be collapsed, thereby shifting the arm 187 so that the lip 186 thereof will be arranged in the path of movement of the lugs 185 which enables one of the variably spaced lugs 185 to come into contact with the lip of the arm 187 to bring the chain driving the gear 180 to a stop. The use of the friction clutch 174 permits of this operation when allowing for continued rotation of the foot shaft 59. By this arrangement, a very great number of different races may be conducted in order that the operators of the game may not become familiar with the race sequence thus produced.

Mounted on the frame structure 19 for pivotal movement as at 191 is a swinging frame 192, the latter being formed with a curved bar or surface 193, which is arranged in the path of movement of a fixed stud or roller 194 carried by the carriage 56. In the initial operation of the apparatus, the carriage 56 moves from the starting position disclosed in Fig. 2 toward its secondary position adjacent to the foot shaft 59, as disclosed in Fig. 14 and the said carriage is held in this position until the race has been completed. During this initial movement of the carriage from its primary to its secondary position, the stud 194 contacts with the curved bar 193, depressing the frame 192 from its full line position, as shown in Fig. 2, to its dotted line position. This results in swinging the frame 192 about its pivot point 191, causing the frame to move a link 195 which extends forwardly to the coin head 27 of the machine.

As shown more particularly in Fig. 10, the forward end of the link 195 is pivotally connected as at 196 with a pair of bell crank levers 197 which are pivotally mounted as at 198 in connection with a stationary portion of the coin head. The upper ends of the bell crank levers are bifurcated to receive pins 199 carried by a vertically sliding bar 200, the latter having its end slidably received within guides 201. Pivotally connected as at 202 with the bar 200 are a plurality of detents 203 formed at their upper ends with spaced shoulders 204 which are adapted when the bar 200 is forced downwardly by the action of the bell crank 197 to enter the coin or token slots 28 provided in said coin head, thereby advancing the coins or tokens from the position indicated at A in Fig. 9 to a secondary position indicated at B. Also, in the event that coins or tokens due to previous operation already occupy the position B, the lower studs or shoulders on the detents 203 will forcibly discharge the coins from the position B and deliver the same into the inclined runway 32 and thence to the token drawer 34.

It will be understood that the construction of the shoulders 204 of the detent 203 is such that when said detents are operated to move the shoulders into engagement with the coin or token, the pressure exerted by the detent will be sufficient to overcome the resistance offered by the upper and lower sets of arms 38 and 39, which normally check the passage of the coin or token through the slots 28 of the coin head. The lower ends of the detents 203 are offset as at 205 and are connected with coil springs 206, the opposite ends of these springs are connected with a bar 207 carried by the bar 200. When the bar 200 is normally positioned, as shown in full lines in Figs. 10 and 13, the shoulders 204 at the upper ends of said detent engage with the outer plates 31 of the coin head in such a manner as to prevent the shouldered portions of said detent from entering the slot 28. However, as the bar 200 is lowered by the action of the bell cranks, these shoulders under the influence of the springs 206, enter the slot 28, and engage with the coins or tokens positioned therein to force the latter from primary to secondary positions and to effect their discharge into the underlying inclined runway.

Mounted on the inner plate 30 of the coin head is a bellows 208, which includes a stationary wall 209 and a movable wall 210, these walls being united by the usual fabric members. A tube 211 connects the interior of the bellows 208 with the valve position D" of the distributor 161, the position D" registering with the position D' of the distributor which is connected by means of a tube 212 and the tube 170 with the compartment 138 of the valve box 137. By this arrangement, whenever one of the oscillating valves 140 is opened by a racer 10 to stop a given race, a suction is transmitted to the bellows 208 to effect the collapsing or partial collapsing thereof. It will be observed that the valve box 137 is connected by the tube 170 with the bellows 100, 189 and 208 so that the cessation of each race, a suction will be produced in each of said last-named bellows.

Carried by the movable wall 210 of the bellows 208 is a movable prong 213 which terminates in alignment with a coin or token situated in the secondary position B of the coin head. In the event a coin or token occupies the position B corresponding to the winning racer of a given race, the collapsing of the bellows 208 effects the contacting of a prong 23 with that coin or token. This results in the opening of a normally closed valve 214 connected with the prong 213, there being a valve 214 for each prong. The contacting of the prong with the coin inserted in the coin head in a position corresponding to the winning racer, results in the opening of the valve 214 so that the suction within the interior of the bellows 208 is transmitted through an opening 215 formed in the wall 210 to a passage 216 also formed in said wall but normally spaced from the opening 215 by the closure of the valve 214. The passages 216 formed in the wall 210 behind each of the valves 214 are connected by means of individual tubes 217 with ports 218 spaced longitudinally in the stop valve box 137.

By reference to Fig. 16, it will be noted that when one of the oscillating valves 140 has been moved to an unlatched position as the result of cooperation with a winning racer, the port 218 associated therewith is covered by the valve 140 thus moved in order that a recess 219 formed in the bottom of each of the valves 140 will provide for communication between the port 218 and a second series of ports 220.

Figure 34:
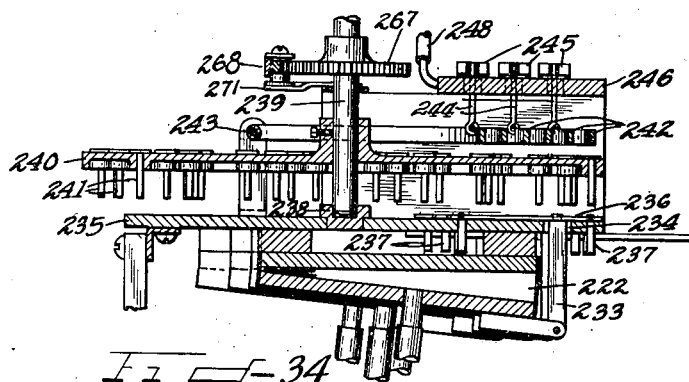
Fig. 34 is a vertical sectional view taken through said operating means on the plane indicated by the line XXXIV—XXXIV of Fig. 33.
Figure 35:
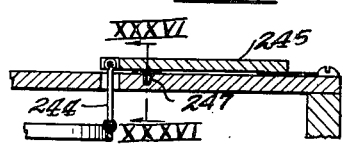
Fig. 35 is a detail vertical sectional view through one of the valves disclosed in Fig. 33 on the plane XXXV—XXXV of Fig. 33.
Figure 36:
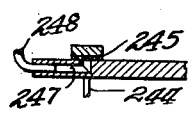
Fig. 36 is a transverse view on the line XXXVI—XXXVI of Fig. 35.

The ports 220 are each individually connected by means of tubes 221 with a plurality of bellows 222 disclosed more particularly in Figs. 4 and 34. Thus the opening of one of the valves 140 by a winning racer will result in the collapsing of a corresponding bellows 222 by producing a partial vacuum in one of said last-named bellows and allowing atmospheric pressure to effect collapsing movement thereof.

Figure 33:
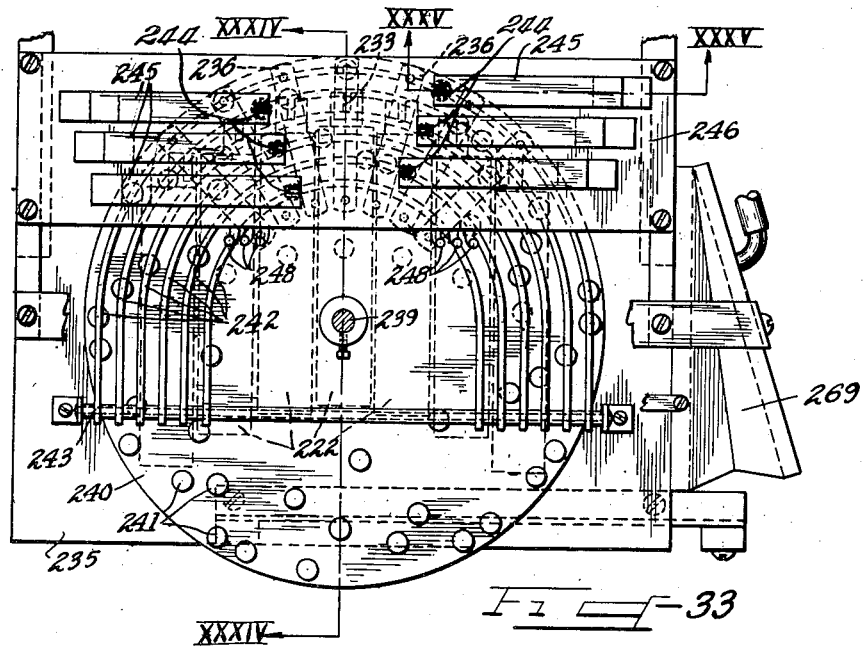
Fig. 33 is a plan view of the permutable operating means for the "pay-off" indicator.

As shown in Figs. 33 and 34, each of the bellows 222 has its movable element connected with a link 233. These links extend upwardly and pass through openings 234 formed in a stationarily supported plate 235. The upper ends of the links 233 are connected with plates 236, which normally rest on the upper surface of the stationary plate 235, the movable plates 236 being provided with depending guide pins 237, passing through openings formed in the stationary plate 235, so that whenever one of the bellows 222 is collapsed, the plate 236 associated therewith will be raised and lowered in a vertical plane.

Rotatably mounted in bearings 238 carried by the plate 235 and other stationary parts of the frame structure 19, is a vertical shaft 239, and rotatable with this shaft is a disk 240. This disk, as disclosed in Figs. 33 and 34, carries a plurality of loosely mounted vertically disposed pins 241 arranged in variably spaced relationship in connection with the rotatable disk. When one of the plates 236 is elevated, it will force one of the pins 241 upwardly and it may be stated that at the time this operation takes place, the disk is in a stationary state and there is no rotation on the part of the shaft 239. The raising of one of the pins 241 effects the oscillation of one of a plurality of U-shaped arms 242 which are mounted for swinging movement about a common axis 243 stationarily supported in connection with the plate 235. The lifting of one of the arms 242 effects the elevation of a link 244 connected therewith, and which link has its upper end pivotally connected with one of a plurality of valves 245 arranged on a flat stationary member 246, forming a part of the stationary frame structure.

The valves 245 normally cover air inlet passages 247 provided in the member 246, and these passages are connected by means of independent tubes 248 with the positions indicated at 2', 4', 8', 12', 16' and 20' of the distributor 161, by which atmospheric pressure may be exerted on the distributor at these last-named positions to cause the elevation of the diaphragm 168 disposed at such position and the opening of the associated valves 166, at the positions 2'', 8'', 16'', 20'', 12'' and 4'' in order to produce a suction in any one of the tubes 249 leading independently from said last-named position of the distributor.

The tube 249 extends to valve bellows 250 as shown more particularly in Figs. 27 to 29. The bellows 250 are employed in combination with their permutation control to indicate the odd which a given racer is supposed to win or by which the player may keep score to determine who is the successful player after a given number of races. The movable section of each of the bellows 250 is provided with a finger 251 which is arranged immediately below one of a plurality of pivoted plates 252, which are viewable from the top of the game as disclosed in Fig. 1. Each of these plates is pivotally mounted as at 253 in connection with their supporting base 254, and it will be seen that when one of the bellows 250 is collapsed, the finger 251 associated therewith will be moved upwardly, causing the oscillation of a registering plate 252 about its pivotal point 253, thereby causing said plate to assume a vertical position so that the attention of the operators of the game will be directed thereto, the balance of the plates 252 remaining in their normal horizontal positions.

By virtue of the permutation means disclosed in Figs. 33 and 34, it will be obvious that a very great number of factors will enter into the raising of any one of the plates 252 at the conclusion of a race, so that even the most skillful players will not be able to foretell which of the plates 253 will be raised at the conclusion of a given race. By this construction, it will also be noted that unless a token or coin occupies a position in the coin head corresponding with the winning racer, there will be no operation on the part of the odds denoting plate 252, since the prong 213 of the coin head bellows will not be operated to provide for the necessary transmission of suction forces to the bellows 250. To restore the plates 252 to their normal positions following the lifting of one of the same, the carriage 56 has its bar 76 formed at one end with the extension 77.

Pivotally carried as at 255 by the vertical portion of the bar extension is a trip 256 which is disposed to engage with the pivoted lever 257 of a valve 258 when the carriage is initially moved from its primary starting position to its secondary race finishing position. The valve 258 is normally closed by a spring 259, and the trip 256 is mounted for pivotal movement in one direction only, so that when the carriage advances, the valve 258 will be positively opened. This allows air under atmospheric pressure to enter a pipe 260, which communicates with the position E' of the distributor 161 allowing the valve at that position to open so that a suction will be produced at the position E''. The suction thus produced is transmitted by way of the tube 261 to a bellows 262. As shown in Figs. 27 and 28, the bellows 262 has its movable member connected with a reciprocating bar 263 supported for sliding movement immediately adjacent to the plates 252. Each of these plates is provided with a crank offset 264 disposed in the path of movement of projections 265 formed laterally on the bar 263 in the event one of the plates 252 is vertically positioned. Therefore, the closing of the bellows 262 at the beginning of a race, effected through the advancement of the racer carriage, will effect automatically the turning of the plates 252 to their downward position without leaving any of them standing.

Figure 3:
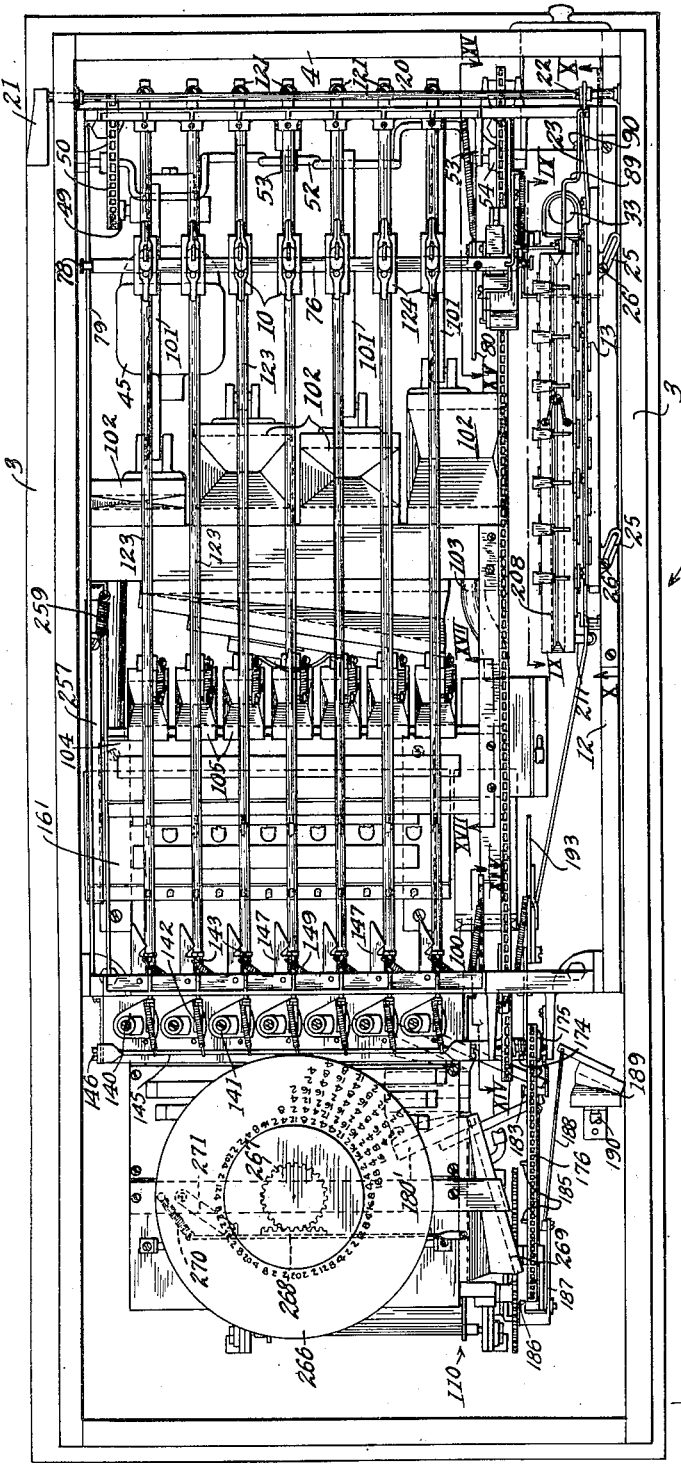
Fig. 3 is a top plan view of the game operating mechanism with the top of the cabinet removed in order to more clearly disclose the interior structure.

Rotatably mounted within the cabinet at the far end thereof over the paper roll mechanism is a handicapping dial 266 of frusto-conical formation, and which bears on its outer periphery numerals corresponding in order to the number of racers 10 and which dial is intended for the purpose of supplying an element of interest in the game in the form of providing preliminary odds on the racers. This dial is carried by the shaft 239 which also supports the disk 240, and the rotation of the shaft 239 is effected by providing the same with the gear wheel 267 which, as shown in Fig. 3, is arranged for engagement with a rack bar 268. This bar is connected at one end with a bellows 269 and at its opposite end with a coil spring 270 and also with a pivoted link 271.

At the beginning of a race, when the lever 257 is actuated to open the valve 258 by the initial movement of the racer carriage, air enters the pipe 260 causing the operation of the distributor to produce a suction in the tube 261. This tube not only leads to the bellows 262 but also to the bellows 269, causing the collapse of the latter and the movement of the rack bar 268 in a direction to rotate the shaft on which the dial 266 is supported, the link 271 serving to effect disengagement of the rack bar with the gear wheel 267 after the dial 266 has been put into rotary motion to provide for a limited amount of free spinning thereof. The figures on the dial 266 may be observed through a slot formed in the stationary inclined portion of the stationary wall 272 overlying the dial. The dial 266 spins but momentarily and then comes to a rest so that the shaft 239 carrying the disk 240 will be stationary at the conclusion of a given race, thus allowing the odds permutation means to function in a desired variable manner. To restore the oscillating valves 140 of the valve box 137 to normal positions covering the ports 139 after a race is over, the bail 145 is oscillated upon its pivot 146 by means of the pivoted lever 273 which is moved by the rocking action of the swinging frame 192. A pin 192' rests in a notch formed in the lever 273 and when the frame 192 is rocked, the pin will engage one edge of the notch and move the lever. A lug 273' formed on the machine frame arrests movement of the lever 273 and the pin 192' will then move out of the notch permitting the lever and the bail to return to their normal position in response to the action of the spring 273a. The pivotal movement of the bail 145 is sufficient to cause the latching of the rod 143 with the fingers 147.

In view of the foregoing, it will be seen that the present invention provides a very complete and practical apparatus of an automatically operated character for producing by mechanical means the thrills, amusement and excitement which prevail in racing sports. The various parts or units of the apparatus are all under the control of the automatically operating pneumatic means and the mechanism specifically avoids the employment of mechanical or electrical devices which are so delicate or sensitive as to readily become out of order and require repair. My improved apparatus, on the other hand, is characterized by its sturdiness and the ability to withstand the severe usage to which apparatus of this character is placed without demanding any unusual mechanical servicing. Of course, it will be understood that I have illustrated and described a specific form in which my invention finds expression. However, I do not desire to be limited to this particular form of my apparatus but reserve the right to employ all such variations and modifications thereof that may be said to fall fairly within the scope of the following claims.

What is claimed is:

1. A game apparatus comprising a raceway formed with starting and finishing ends, a plurality of racing objects positioned for longitudinal movement over said raceway, pneumatically actuated means provided in connection with said objects for moving them over said raceway, means including a tracker bar and a perforated strip associated with said pneumatically actuated means for controlling the operations of said pneumatically actuated means, valve means associated with said pneumatically actuated means and positioned at the finishing end of said raceway and operated by the first racing object reaching said finishing end to discontinue the operation of said pneumatic means, and means for returning said racing objects to the starting end of said raceway.

2. A game apparatus comprising a raceway formed with starting and finishing ends, a plurality of racing objects positioned for longitudinal movement over said raceway, pneumatically actuated means provided in connection with said objects for intermittently moving them over said raceway, a tracker bar and perforated strip associated with said pneumatically actuated means movable thereover for controlling the operation of said racer moving means, means for moving said perforated strip over said tracker bar, valve means associated with said pneumatically actuated means and located at the finishing end of said raceway and arranged to be operated by any one of said racing objects to discontinue the operation of said racer moving means, and means for automatically returning said racing objects to the starting end of said raceway.

3. A game apparatus comprising a raceway formed with starting and finishing ends, a plurality of racing objects movable over said raceway, pneumatically actuated means provided in connection with said objects for intermittently moving them over said raceway, a tracker bar connected with said pneumatic means, a perforated strip movable over said tracker bar associated therewith and said pneumatic means to control the operation of said pneumatic means, driving means for moving said strip over said tracker bar, means provided in connection with said driving means for reversing the direction of movement of said strip, means for interrupting said strip driving means to vary the sequence of operation of said pneumatic means, means associated with said pneumatic means and positioned at the finishing end of the raceway and operated by the winning racer for discontinuing the race, and means for automatically returning the racing objects to the starting end of the raceway.

4. A device of the character described, comprising a raceway formed with starting and finishing ends, a plurality of independently movable racers thereon, separate pneumatically actuated means for each of said racers for imparting movement thereto, a tracker bar, a perforated strip, driving means adjacent said tracker bar for moving said strip over said tracker bar, means including a motor driven bellows for creating a sub-atmospheric pressure to operate said pneumatic means, means arranged at the finishing end of the raceway and actuated by the winning racer for stopping said race and starting the operation of racer returning means, and means actuated by said returning means upon its arrival at the starting end of the raceway to discontinue the operation of the pressure creating means.

5. A device of the character set forth, comprising a raceway formed with starting and finishing ends, a plurality of independently movable racers thereon, separate pneumatically actuated means including a bellows for each of said racers to impart movement thereto, means for creating a sub-atmospheric pressure, a tracker bar, a perforated band movable over said bar, valve means actuated by the registration of the perforations in said band with openings in said tracker bar to connect said racer bellows with said pressure creating means, racer returning means for moving the racers back to the starting end of the raceway at the completion of a race, means including a bellows for setting said racer returning means in operation, valve means arranged at the finishing end of said raceway and actuated by the winning racer for connecting said bellows with said pressure creating means, and control means positioned near the starting end of said raceway and actuated by the racer returning means for discontinuing the operation of the device.

6. A device of the character set forth, comprising a raceway formed with starting and finishing ends, a plurality of independently movable racers thereon, means provided in connection with said racers for causing their advancement over said raceway, bellows for actuating said racer advancing means, motor driven means for creating sub-atmospheric pressure, a valve box connected with said racer actuating bellows, a tracker bar provided with openings and connected to said valve box, a perforated band movable over said tracker bar and operable to cause the variable actuation of the valves in said valve box upon the registration of the perforations with the openings in said tracker bar to connect said bellows with said pressure creating means, means arranged at the finishing end of the raceway and actuated by the winning racer for terminating the race, racer returning means, means for causing the operation of the returning means, and switch means for discontinuing the operation of the device operated by said racer returning means upon its arrival at the starting end of the raceway.

7. A device of the character described, comprising a frame, a motor on said frame, a crank shaft driven by said motor, sub-atmospheric pressure creating means driven from said crank shaft, flexible driving means extending longitudinally of said frame and operated by said motor, a carriage movable longitudinally of said frame and having a selectively engageable connection with said flexible driving means, a raceway, independently movable racers positioned on said raceway, pneumatically operated means for moving said racers over said raceway, valve means for connecting said pneumatic means with said pressure creating means, a controlling means for said valve, said controlling means including a tracker bar and a perforated band, means for moving said band over said tracker bar, said means being driven by said driving means, and means arranged at each end of said raceway for automatically connecting and disconnecting said carriage with said flexible driving means.

8. A device of the character described, comprising a frame, a motor mounted on said frame, a crank shaft driven by said motor, sub-atmospheric pressure creating means driven from said crank shaft, flexible driving means extending longitudinally of said frame and operated by said motor, a carriage member movable longitudinally of said frame and having a selectively engageable connection with said driving means, a raceway associated with the carriage member, a plurality of independently movable racers positioned on said raceway, pneumatically operated means for moving said racers over said raceway, valve means for connecting said pneumatic means with said pressure creating means, a tracker bar, a perforated band cooperating with said tracker bar to permit pressure to variably operate said valve means, driving means for said perforated band including a pair of gears, a driving gear driven by said flexible driving means for alternately engaging one or the other of said pair of gears, and means including a pair of bellows for effecting the shifting of said driving gear for reversing the direction of travel of said band, said bellows being connected with said pressure creating means by the registration of a perforation in said band with certain of the openings in said tracker bar.

9. A device of the character described, comprising a frame, a raceway carried by said frame, a racer movable over said raceway, means for moving said racer including a notched bar mounted for reciprocatory movement on said frame, a bracket supporting said racer, a latch connected to said bracket and cooperating with said notched bar to move said racer, a bellows carried by said frame and connected to said notched bar, and means for creating a sub-atmospheric pressure in said bellows to cause its collapse to move said bar.

10. In a racing game apparatus including a raceway and a plurality of independently movable racers thereon, a motor, sub-atmospheric pressure creating mechanism driven by said motor, pneumatic pressure responsive means for moving said racers and actuated by pressures created by said mechanism, and winner indicating means actuated by the winning racer.

11. In a racing game apparatus including a raceway and a plurality of independently movable racers thereon, a motor, mechanism supporting said racers and driven by said motor, mechanism for initiating the operation of said motor with a coin, carriage means driven by said motor for returning said racers to a starting position after the conclusion of the race, and switch means actuated by said carriage for controlling the operation of said motor.

12. In a racing game apparatus including a raceway and a plurality of independently movable racers thereon, a frame, a motor mounted on the frame, a carriage movable longitudinally of said frame, mechanism for initiating the operation of said motor with a coin, switch means operated by said carriage for controlling the operation of said motor, and means also operated by said carriage for moving a coin from the said mechanism.

13. In a racing game apparatus including a raceway and a plurality of independently movable racers thereon, sub-atmospheric pressure generating mechanism, a motor for operating said mechanism, pneumatic means connected to said pressure generating mechanism for imparting motion to said racers, a perforated record, controlling means for said motion imparting means operated by the perforated record, indicating mechanism operated by pressure from said generating mechanism, racer returning mechanism, and means whereby said indicating mechanism is set in operation by said racer returning mechanism.

14. In a racing game apparatus including a raceway and a plurality of independently movable racers thereon, pneumatic pressure generating mechanism, a motor for operating said mechanism, pneumatic means connected to said pressure generating mechanism for imparting motion to said racers, a perforated record, controlling means for said motion imparting means operated by the perforated record, indicating mechanism actuated by pressure from said generating mechanism, valve means for initiating the operation of said indicating mechanism, and informing mechanism actuated by pressure from said generating mechanism.

15. In a racing game apparatus including a raceway, a plurality of independently movable racers thereon and means for returning said racers to a starting position, a motor, pneumatic pressure generating mechanism operated by said motor, pressure responsive means for moving said racers, a tracker bar, a perforated record, controlling means for said pressure responsive means operated by the perforated record moving over the tracker bar, a rotatable dial, pressure responsive means for rotating said dial, valve means for controlling said rotating means, said valve means being operated by the returning means for said racers.

16. In a racing game apparatus including a raceway, a plurality of independently movable racers thereon and means for returning said racers to a starting position, a motor, pneumatic pressure generating mechanism operated by said motor, pressure responsive means for moving said racers, a tracker bar, a perforated record, controlling means for said pressure responsive means operated by the perforated record moving over the tracker bar, means for interrupting the movement of said record over said tracker bar to change the sequence of operation of said controlling means, said interrupting means being put into operation by the winning racer.

17. In a racing game apparatus including a raceway and a plurality of independently movable racers thereon, a motor, pneumatic pressure generating mechanism operated by said motor, pressure responsive means connected with said generating mechanism for moving said racers, controlling means for said pressure responsive means arranged between it and said generating mechanism, means for operating said controlling means including a tracker bar, a perforated record movable over said tracker bar, means for moving said record over said tracker bar, said means comprising a roller arranged on each side of said tracker bar, a gear provided on each of said rollers, and a driving pinion driven by said motor and selectively engageable with the gears on said rollers.

18. A device of the character described, comprising a raceway, a racer movable over said raceway, means for moving said racer, including a notched bar mounted for reciprocatory movement adjacent said racer, a bracket supporting said racer, a latch connected to said bracket and cooperating with said notched bar to move said racer, a bellows having a stationary section and a movable section, said movable section being connected to said bar, means for creating a sub-atmospheric pressure in said bellows to cause its collapse to move said bar in one direction, and spring means connected with said bar to move it in the opposite direction and to expand said bellows.

19. A device of the character described, comprising a frame, a raceway provided on said frame, a rod carried by said frame and extending longitudinally of said raceway, a racer supporting bracket slidably mounted on said rod, a plate arranged on said rod and connected by a spring with said bracket, a latch carried by said plate, a notched bar mounted for sliding movement on said frame and engaged by said latch, pneumatic means for moving said bar in one direction, and spring means connected with said frame and bar for moving said bar in the opposite direction.

20. A device of the character described, comprising a frame, a raceway carried by said frame, a rod carried by said frame and extending longitudinally of said raceway, a racer supporting bracket slidably mounted on said rod, a plate arranged on said rod and connected by a spring with said bracket, a latch carried by said plate, a notched bar slidably mounted on said frame and engaged by said latch, pneumatic means carried by said frame for moving said bar and bracket in one direction, spring means connecting said frame and bar for moving said bar only in the opposite direction, and returning means arranged to disengage said latch from said bar and move said racer supporting bracket in the opposite direction.

21. A game device comprising a housing, a raceway supported within said housing, a plurality of independently movable racer supporting brackets positioned adjacent said raceway, an endless chain extending substantially parallel to said raceway, motor operated means for moving said chain, a racer return carriage arranged to be moved parallel to said raceway by said chain, and shifting means positioned near the ends of said raceway for reversing the direction of movement of said carriage.

22. A game device comprising a housing, a raceway supported within said housing, a plurality of racer supporting brackets mounted for longitudinal movement adjacent said raceway, pneumatically operated means associated with said brackets for moving them forwardly along said raceway, an endless chain-like element extending substantially parallel to said raceway, motor driven means for moving said chain, means for starting the operation of said motor, a carriage for moving said brackets rearwardly arranged to be operated by said chain, and switch means operated by said carriage when it completes its rearward movement to stop the operation of said motor.

23. A game device comprising a housing, a raceway supported within said housing, a plurality of racer supporting brackets mounted for longitudinal movement adjacent said raceway, pneumatically actuated means associated with said brackets for moving them forwardly along said raceway, an endless chain-like element extending substantially parallel to said raceway, motor driven means for moving said chain, means for starting the operation of said motor, a carriage for moving said brackets rearwardly arranged to be operated by said chain, a controlling means for said pneumatically actuated means including a tracker bar arranged between a pair of rolls, a perforated record carried by said rolls and movable over said tracker bar, and driving means for moving said record, said driving means being actuated by said endless chain.

24. In a racing game apparatus provided with a raceway, a plurality of racers independently movable over said raceway, pneumatic pressure actuated means for moving said racers, power driven means for creating the pneumatic pressure, a controlling system for said pneumatic pressure actuated means including a tracker bar, a perforated record movable over said tracker bar, and a pressure distributor arranged between the pressure creating means and the pressure actuated means and connected with said tracker bar to be actuated by the registration of the perforations in said record with openings in said tracker bar.

25. In a racing game apparatus provided with a raceway, a plurality of racers movable independently over said raceway, pneumatic pressure actuated means for moving said racers and subatmospheric pressure creating means, a controlling device for said pneumatic means including a tracker bar, a perforated record movable over said tracker bar, a distributor arranged between said pressure creating means and said pressure actuated means, said distributor being formed with a chamber directly connected with said pressure creating means, ports connecting said chamber with the pneumatic pressure actuated means, valves normally closing said ports, and diaphragm means operated by atmospheric air for moving said valves to an open position to connect said pneumatic means with said pressure creating means.

26. In a racing game apparatus, a raceway supported on a frame, a plurality of independently movable racers, a pneumatic system for operating said racers including a motor-operated subatmospheric pressure creating means, a plurality of pressure operated members for moving said racers, a distributor arranged between said pressure creating means and said members, valves arranged in said distributor, means for moving said valves, a tracker bar provided with openings communicating with said distributor, and a perforated record movable over said tracker bar to admit atmospheric air to said distributor to actuate the valve moving means.

27. In a racing game apparatus, the combination of a frame, a raceway carried by said frame, a rod carried by said frame and extending longitudinally of said raceway, a racer supporting bracket slidably mounted on said rod, a plate carried by said rod and movably connected with said bracket, a detent carried by said plate, and a notched bar mounted for sliding movement on said frame for engagement with said detent.

28. A racing game device comprising a housing, a raceway having longitudinal slots therein supported within said housing, a plurality of independently movable racers positioned adjacent said raceway and moving in said slots, an endless chain mounted in said housing and extending substantially parallel to and below said raceway, a motor, and means connecting said motor and said chain for operating said chain by said motor and moving said racers in said slots.

29. A game device comprising a housing, a raceway supported within said housing, a plurality of racer supporting brackets mounted for longitudinal movement adjacent said raceway, means associated with said brackets for moving them forwardly along said raceway, an endless chain-like element extending substantially parallel to said raceway, a motor, motor driven means for moving said chain, means for starting the operation of said motor, a carriage for moving said brackets rearwardly arranged to be operated by said chain, and switch means operated by said carriage when it completes its rearward movement to stop the operation of said motor.

30. In a racing game apparatus, the combination of a frame, a rod carried by said frame, a racer supporting bracket slidably mounted on said rod, a plate carried by said rod and movably connected with said bracket, a detent carried by said plate and a notched bar mounted for sliding movement on said frame for engagement with said detent.

31. In a device of the kind described, in combination, a stationary supporting bar, a racing figure carrier reciprocably mounted thereon, a locking member slidably reciprocative on the bar and tiltable thereon to and from cramped locking engagement with said bar, and engaging and movable with the carrier, and when locked to said bar holding the carrier from forward but permitting its rearward movement, means for moving the locking member from locking engagement with said bar, and mechanical means which exerts a continuous yielding pressure against said locking member tending to force the latter into cramped locking engagement with said bar.

32. Racer operating mechanism for mechanical games comprising a supporting frame, a guide rod carried by said frame, a bracket slidably mounted for longitudinal movement on said rod, a racer carried by said bracket, a brake member movably carried by said bracket and provided with an opening for the reception of said rod, spring means coacting with said brake member and serving to maintain the latter in gripping engagement with said rod to restrain said bracket against forward or advancing movement on said rod, a reciprocating bar carried by said frame, said bar having a notched edge, and a trigger pivotally carried by said brake member for engagement with the notched edge of said bar.

33. Racer operating mechanism for mechanical games comprising a frame having a stationary longitudinally extending support, a bracket slidably mounted for longitudinal movement on said support, a racer carried by said bracket, a brake member movably depending from said bracket, said member being formed with an opening through which said support passes, resilient means coacting with said brake member to maintain the latter in such position that the walls of the opening therein engage with the outer walls of said support to resist forward travel of said bracket on said support, an actuating bar carried by said frame, said bar having a notched edge, means for imparting sliding back and forth movement to said actuating bar, and a trigger movably carried by said brake member for coaction with the notched edge of said bar.

34. In mechanically operated racing mechanism, a frame, a racing figure, a base for said figure, a stationary longitudinally extending guide carried by said frame upon which said base is mounted for sliding movement, a movable brake device carried by said base and having an opening formed therein for the reception of said guide, means supported in connection with said base normally tending to maintain the walls of the opening in said brake device in clutching engagement with said guide to resist forward sliding movement of said base on said guide, reciprocating means carried by said frame for imparting sliding movement to said base, and a pusher element disposed between said reciprocating actuating means and said brake device, whereby upon movement of said reciprocating means in one direction, said brake device will be moved to a position releasing said base to admit of its sliding movement along said guide in accordance with the advancing stroke of said reciprocating means.

HOMER S. WILLIAMS.